(12) United States Patent
Ragnet et al.

(10) Patent No.: US 7,930,407 B2
(45) Date of Patent: Apr. 19, 2011

(54) METHOD AND APPARATUS FOR CONTROLLING DOCUMENT SERVICE REQUESTS FROM A MOBILE DEVICE

(75) Inventors: Francois Ragnet, Venon (FR); Christer Fernstrom, St-Ismier (FR)

(73) Assignee: Xerox Corporation, Norwalk, CT (US)

( * ) Notice: Subject to any disclaimer, the term of this patent is extended or adjusted under 35 U.S.C. 154(b) by 266 days.

(21) Appl. No.: 12/166,176

(22) Filed: Jul. 1, 2008

(65) Prior Publication Data

US 2008/0270516 A1    Oct. 30, 2008

Related U.S. Application Data

(62) Division of application No. 10/605,874, filed on Nov. 3, 2003, now Pat. No. 7,409,452.

(60) Provisional application No. 60/319,982, filed on Feb. 28, 2003.

(51) Int. Cl.
*G06F 15/16* (2006.01)

(52) U.S. Cl. ....... 709/227; 455/41; 455/553.1; 358/1.15

(58) Field of Classification Search .................. 358/1.15; 709/227; 370/338
See application file for complete search history.

(56) References Cited

U.S. PATENT DOCUMENTS

| | | | |
|---|---|---|---|
| 5,862,321 A | 1/1999 | Lamming et al. | |
| 6,288,790 B1 * | 9/2001 | Yellepeddy et al. | ......... 358/1.15 |
| 6,397,261 B1 | 5/2002 | Eldridge et al. | |
| 6,421,716 B1 | 7/2002 | Eldridge et al. | |
| 6,430,601 B1 | 8/2002 | Eldridge et al. | |
| 6,452,692 B1 * | 9/2002 | Yacoub | ......................... 358/1.15 |
| 6,487,189 B1 | 11/2002 | Eldridge et al. | |
| 6,493,760 B1 | 12/2002 | Pendlebury et al. | |
| 6,515,988 B1 | 2/2003 | Eldridge et al. | |
| 6,724,496 B1 * | 4/2004 | McIntyre | ..................... 358/1.15 |
| 6,762,852 B1 * | 7/2004 | Fischer | ....................... 358/1.15 |
| 7,190,477 B2 | 3/2007 | Ferlitsch | |
| 7,363,051 B2 | 4/2008 | Bridgelall | |
| 7,580,395 B2 * | 8/2009 | Boatwright et al. | .......... 370/338 |

(Continued)

FOREIGN PATENT DOCUMENTS

EP    08 937 60    1/1999

OTHER PUBLICATIONS

Content Beamer, "How It Works," Oct. 30, 2003 (Available on the Internet at http://www.contentbeamer.com/).

(Continued)

*Primary Examiner* — Dustin Nguyen
(74) *Attorney, Agent, or Firm* — Oliff & Berridge, PLC

(57) ABSTRACT

Methods for controlling a document service request involve defining a document service request workflow and redirecting document service requests from the mobile device. In one embodiment, through a short-range connection with a document processing device on a foreign network, a mobile device establishes a secure connection to the mobile device's native network to identify a document stored on a file server operating thereon. Once a document is identified, the mobile device over the secure connection initiates a document service request by requesting an output server operating on the native network to retrieve and convert the identified document into an output-ready format suitable for the document processing device. Upon receipt of the output-ready document, the mobile device resends the output-ready document over a local connection to the document processing device to carry out the document service request.

10 Claims, 16 Drawing Sheets

U.S. PATENT DOCUMENTS

| | | | |
|---|---|---|---|
| 2001/0029531 A1 | 10/2001 | Ohta | |
| 2002/0077896 A1 | 6/2002 | Liu et al. | |
| 2002/0097424 A1* | 7/2002 | Ferlitsch | 358/1.15 |
| 2002/0184299 A1 | 12/2002 | Chuo et al. | |
| 2002/0186407 A1 | 12/2002 | Laughlin | |
| 2002/0186410 A1* | 12/2002 | Tanaka | 358/1.15 |
| 2003/0002072 A1 | 1/2003 | Berkema et al. | |
| 2003/0017805 A1 | 1/2003 | Yeung et al. | |
| 2003/0050963 A1 | 3/2003 | Lamming et al. | |
| 2003/0054794 A1 | 3/2003 | Zhang | |
| 2003/0067624 A1 | 4/2003 | Anderson et al. | |
| 2003/0069921 A1 | 4/2003 | Lamming et al. | |
| 2003/0137954 A1 | 7/2003 | Yokoyama | |
| 2003/0196087 A1 | 10/2003 | Stringer et al. | |
| 2003/0217103 A1 | 11/2003 | Yamamoto et al. | |
| 2004/0041848 A1 | 3/2004 | Wegeng et al. | |
| 2004/0131078 A1 | 7/2004 | Gupta et al. | |
| 2004/0167974 A1 | 8/2004 | Bunn et al. | |
| 2005/0030375 A1 | 2/2005 | Zangrande et al. | |
| 2007/0115819 A1 | 5/2007 | Stephens et al. | |

OTHER PUBLICATIONS

Content Beamer (Version 2.0), User Manual Abridged Edition, Oct. 30, 2003 (available on the Internet at http://www.contentbeamer.com/).

Bluetooth Brochure Jun. 1, 2000.

Roving Networks, BlueLine, Bluetooth Access Point, Mode, Dec. 2002 (available on the Internet at http://www.rovingnetworks.com/).

Bluetooth Basic printing profile, May 10, 2001 (available on the Internet at http://www.Bluetooth.com/).

Security Comparison: Bluetooth vs 802.11, Feb. 1, 2002 (available on the Internet at http://www.Bluetooth.com/).

HP e-Services Secure Print brochure, 2001 (available on the Internet at http://www.hpgsc.com/).

"HP Wire: Enabling E-Printing Solutions for Enterprise," Aug. 2001 (available on the Dei.sp Internet at http://www.hpwire.com/).

Behind hp wireprint, Aug. 2001 (available on the Internet at http://www.hpwire.com/).

HP and Nokia Work Together on Wireless Printing Concept for Series 60 Phones, Feb. 18, 2003 (available on the Internet at http:www.hp.com/).

ClusterQue™ Automatic Print Job Redirection, Oct. 2001 (available on the Internet at http://www.clusterque.com/).

ClusterQue™ Product Description, Dec. 2001 (available on the Internet at http://www.clusterque.com).

HP White Paper on Bluetooth and 802.1 lb Printing (available on the Internet at http://h30046.www.3.hp.com/uploads/whitepapers/Bluetooth_80211b.PDF.).

META message for Wireless, "Technical White Paper", Version 4.1, Onset Technology mPrint, Aug. 12, 2003 (available on the Internet at http://www.onsettechnology.com/).

Peerless MagicPrint Datasheet, 2003 (available on the Internet at http://magicprint.net/).

Zenographics MobilePrint Overview (available on the Internet at http://mp.zeno.com/).

PrintBoy printing software for Windows CE (available on the Internet at http://www.bachmannsoftware.com/).

"PrintBoy Office Bundle", Cutting Edge Software, Inc., 1996-2001 (available on the Internet at http://www.cesinc.com/).

EFI's PrintMe web site, "What is a PrintMe Station?" and "PrintMe. Leave the Technology to Us" Feb. 15, 2003, (available on the Internet at http://www.printme.com/).

Borisov, Goldberg, Wagner, "Security of the WEP Algorithm," (available on the Internet at http://www.Isaac.cs.Berkeley.edu/) (verified Dec. 12, 2002).

Flynn et al., "The Satchel System Architecture: Mobile Access to Documents and Services" *Mobile Networks and Applications*, vol. 5, Issue 4, pp. 243-258, 2000.

Lamming et al., "Satchel: Providing Access to Any Document, Any time, Anywhere", *ACM Transactions on Computer-Human Interaction*, vol. 7, Issue 3, pp. 322-352, 2000.

"U.S. Wireless and Mobile Printing Forecast and Analysis, 2002-2006", Analysts: Daniel Corsetti and Alyson Frasco, Document #: 28275, Publication Date: Nov. 2002, Published Under Services: Hardcopy Peripherals: Technology—(See in particular pp. 29-40).

N. Marmasse, C. Schmandt, MIT Media Lab, "Location-Aware Information Delivery with Commotion" HUC 2000 Proceedings, pp. 157-171.

Kai Wendlandt, Ahmed Ouhmich, Michael Angermann, Patrick Robertson, "Implementation of Soft Location on Mobile Devices", International Symposium on Indoor Localisation and Position Finding, Jul. 2, 2002, DGON Germany.

R. Want, B. Schilit, N. Adams, R. Gold, K. Petersen, D.Goldberg, J. Ellis and M. Weiser, "The ParcTab Ubiquitos Computing Experiment", Xerox Parc Technical Report CSL-95-1, Mar. 1995.

Print Service Interface (PSI) (available on the Internet at http://www.pwg.org/ps/index.html.).

HP Mobile Printing SDK for Pocket PC (available on the Internet at http://www.hpdevelopersolutions.com/mobile/finalskdatasheet3.pdf) 2003.

Christial Blaafjell, Mei-Pin Lan, John O'Dwyer, Hong Jieh Daniel Yang, "A Comparative Analysis of IPSecand SSL" (available on the Internet at http://citeseer.nj.nec.com/).

Field Software Products: PrintPocketCE, PocketPrintPix, PocketShot, PocketClipPrint (available on the Internet at http://www.fieldsoftware.com/PrintPocketCE.htm).

European Search Report for EPO counterpart Application No. EP04004397, Jul. 9, 2004.

European Search Report for Application No. EP 10 177 434.7, issued Nov. 24, 2010.

European Search Report for Application No. EP 10 177 432.1, issued Nov. 24, 2010.

* cited by examiner

FIG. 15

```
1500
<?xml version="1.0" encoding="UTF-8"?>
<ns:DocumentDistributionWorkflows xmlns:ns="DDWF">
 <Document Distribution Workflow>
   <Scan>                                              ⎫
       <Output>Multipage TIFF</Output>                 |
       <Sides>Duplex</Sides>                           ⎬ 1502
       <Resolution>400 dpi</Resolution>                |
       <Quality>High</Quality>                         |
   </Scan>                                             ⎭
   <Transfer>                                          ⎫
       <TransferMethod>FTP</TransferMethod>            |
       <FtpServer>ftp.xrce.xerox.com</FtpServer>       |
       <FtpUseAuth>0</FtpUseAuth>                      ⎬ 1504
       <Ftplogin>anonymous</Ftplogin>                  |
       <Ftppassword>ragnet@xrce.xerox.com</Ftppassword>|
   </Transfer>                                         ⎭
   <Workflow description>
       <DocumentDistributionServer>dd1.xrce.xerox.com
         <DDUser>fragnet</DDUser>
         <Ddpasswd>blurp</Ddpasswd>
         <DDStep1 servicetype ="store">                 ⎫
             <server="docushare.grenoble.xrce.xerox.com">|
             <FileName>Scanneddoc.tiff</FileName>        ⎬ 1506
             <Location>/Francois's scanned documents/date</Location>|
         </DDStep1>                                     ⎭
         <DDStep2 servicetype="summarize">              ⎫
             ...                                        ⎬ 1508
         </DDStep2>                                     ⎭
         <DDStep 3 servicetype="share">                 ⎫
             <server="smtp.grenoble.xrce.xerox.com">    |
             <email1>Mary@xrce.xerox.com</email1>       |
             <email2>Emil@xrce.xerox.com</email2>       ⎬ 1510
             <email3>Irene@xrce.xerox.com</email3>      |       1512
             <email4>Jean-Luc@xrce.xerox.com</email4>   |
         </DDStep3>                                     ⎭
         ...
         ///
       </DocumentDistributionServer>
   </Workflow description>
 </Document Distribution Workflow>
</ns:DocumentDistributionWorkflows>
```

1505 brackets 1506, 1508, 1510

METHOD AND APPARATUS FOR CONTROLLING DOCUMENT SERVICE REQUESTS FROM A MOBILE DEVICE

CROSS REFERENCE TO RELATED APPLICATIONS

The present application is a divisional application of Application Ser. No. 10/605,874 filed Nov. 3, 2003, which claims the benefit of U.S. Provisional Application No. 60/319,982, filed Feb. 28, 2003. The disclosures of the parent application and the provisional application are hereby incorporated by reference in their entirety.

BACKGROUND OF INVENTION

The present invention relates generally to document services accessible from a mobile device, and more specifically to a method and apparatus for initiating and controlling a document service request from a mobile device.

Generally, while the use of mobile computing devices continues to increase, they continue to have limited storage capacities. Thus, although it may be possible to store documents on mobile devices, the size and number of documents stored on mobile computing devices tends to be limited. In addition, documents continue to increase in size because they include combinations of text, graphics, images, audio, and video, and consequently there exists a need for a capability to manage documents on mobile devices without requiring that they be physically present on the devices.

Besides the problem of limited storage on mobile computing devices, documents may need to be accessed in real time because they have been recently created or modified. That is, even if a document has been stored on a mobile computing device, a user may need to access the document from another location because recent updates are not incorporated in the document stored on the mobile computing device. Alternatively, real time access to documents may be desirable when unexpected access to a document that was not previously planned for is required and that document is not stored on the mobile computing device.

Furthermore as the use of mobile computing devices continues to increase, it is becoming increasingly desirable to have secure access to documents stored at a native (or home) location while traveling to remote (or foreign) locations. It is also becoming increasingly desirable to have the ability to discover the availability of document services available at a foreign location (away from the native location), while at the same time having the ability to initiate and control document service requests at the foreign location on documents available at native locations.

Token-enabled mobile computing devices provide one solution to these problems (hereinafter referred to as "the original token-based environment"). The original token-based environment is described in the following patents, which are hereby incorporated herein by reference: U.S. Pat. Nos. 5,862,321 and 6,144,997 entitled "System and method for accessing and distributing electronic documents"; U.S. Pat. No. 6,397,261 entitled "Secure token-based document server"; U.S. Pat. No. 6,421,716 entitled "System for generating context-sensitive hierarchically ordered document service menus"; U.S. Pat. No. 6,430,601 entitled "Mobile document paging service"; U.S. Pat. No. 6,487,189 entitled "Mobile e-mail document transaction service"; U.S. Pat. No. 6,493,760 entitled "Standalone device for identifying available document services in a token-enabled operating environment"; U.S. Pat. No. 6,515,988 entitled "Token-based document transactions".

The original token-based environment distributes references to documents between mobile computing devices by transmission of the document references, rather than the documents themselves. More specifically, a mobile computing device described in the original token-based environment is adapted to store a collection of document identifiers (e.g., a URL "Uniform Resource Locator"). Each document identifier in the collection identifies a particular document, or service. Each mobile computing device thus holds document references, rather than the documents themselves, thereby eliminating the concern of storage capacity of the mobile computing device. Large documents containing any form of data can therefore apparently be carried using a mobile device and used to construct a transaction request that can itself be submitted to a remote service such as a print service.

Mobile computing devices operating in the original token-based environment are thus programmed to receive, transmit, and store document identifiers. Each document identifier stored on a mobile computing device is associated with an electronic document stored in an electronic repository. In the original token-based environment, a document can be sent to a token-enabled (e.g., an IR transceiver equipped) network printer by "beaming" a document token, which references the document, from a mobile computing device to the network printer. The token-enabled network printer retrieves the complete document referenced by the document token, and immediately prints a copy of the document. So, to a user of the mobile computing device, documents are apparently passed between users, and output from, or input to token-enabled devices coupled to networks as expansive as the Internet.

In general, the original token-based environment provides that only a small amount of document data (e.g., document name and location) relating to a document is actually stored on the mobile computing device. Typically this is not a disadvantage since most mobile computing devices have a small display (or user interface) that limits the extent to which documents may be viewed. More importantly, this is not a disadvantage because mobile computing devices generally do not have application specific software installed which would impose additional storage and processing requirements for enabling the viewing and/or editing of documents stored in a particular application dependent format. For example, a document stored in the Microsoft® Word format cannot be displayed without software adapted to interpret that specific format. Thus, more generally it is not helpful to store documents on mobile computing devices because there tends to be inadequate storage and/or processing capacity for application software and data.

Presently, "non-token enabled" mobile computing devices operate using application specific and device specific programs that enable printing from a PDA (Personal Digital Assistant) to a standalone infrared (IR) enabled printer. For example, application specific programs that operate on a PDA such as Quickoffice™ sold by Cutting Edge Software, Inc. allow a user to create, edit, and view documents in the Microsoft® Word format. In addition, printer (more generally device) specific programs operate with the application specific software such as PrintBoy™ sold by Cutting Edge Software, Inc. to enable beaming from a PDA to a standalone IR enabled printer through a printer's IR port.

In addition to requiring application specific and device specific programs, such non-token enabled mobile computing devices must be pre-configured with print drivers to render documents in particular printer dependent formats (e.g., postscript, PCL). In particular, less expensive printers tend to require more specific print drivers (i.e., more printer dependent) than more expensive printers. Absent specific printer dependent drivers, documents stored directly on such non-token enabled mobile devices cannot be readily rendered to a format that will insure the most accurate reproduction of a document when beamed to the standalone IR enabled printer.

A disadvantage of such non-token enabled mobile computing devices over token-enabled mobile computing devices is that they only allow printing of documents stored directly on the PDA. An additional disadvantage of such non-token enabled mobile computing devices with application specific software loaded thereon is that the application specific software may not be exactly compatible with the original software that created a document. This incompatibility in software may cause the document to be rendered (i.e., print, view, etc.) at the mobile computing device different from the document creation software, with usually lower quality because of the PDA's limited processing power.

Unlike non-token enabled mobile computing devices, the mobile computing devices that are token-enabled with the original token-based environment (i.e., token-enabled mobile computing devices) do not require that application specific programs or print drivers be loaded directly onto the mobile computing device. Instead, a device such as a printer is token-enabled when it is has access to hardware and device specific software that enables it to receive both a document service request (over a wireless network), and the document to which the document service request references (over a wired network from a remote server coupled thereto). Token-enabling devices thus advantageously permits documents stored at locations other than directly on the mobile computing device to be output to devices such as printers.

However, because many output devices are not token-enabled, their services (e.g., printing, faxing, displaying, playing, etc.) are not immediately available to mobile computing devices that are token-enabled (i.e., loaded with a token-enabling device specific software). Devices not equipped to transmit, receive, and manage document tokens (i.e., non token-enabled devices), however, can be made token-enabled with the addition of a token-enabler unit (e.g., an infrared transceiver, and associated computer and software). In this configuration, the non-token enabled device mounted with a token-enabler unit is made token-enabled as long as it has an existing network connection with a token-enabled server, as described in U.S. Pat. No. 6,515,988.

However even with the token-enabler unit, some token-enabled mobile computing devices may continue to have no connectivity with output devices that remain non token-enabled because there is no existing network connection between a token-enabled server and the output device. In addition, some token-enabled mobile computing devices may suffer from inadequate preexisting connectivity with token-enabled output devices. Inadequate preexisting connectivity (i.e., can't adequately get from a source to a destination) may exist when circumstances make it more advantageous to communicate with a token-enabled device over one communications channel instead of another. For example, printing in an existing token-based network may require that the content of the document be transmitted from a token-enabled server over an insecure and/or unreliable network such as the Internet to a printer.

The following U.S. Patent Application Publication No. and U.S. Patent No., which are incorporated herein by reference, provide solutions to these and other problems: U.S. Patent Application Publication No. 2003/0050963, entitled: "Method and Apparatus For Controlling Document Service Requests Using A Mobile Computing Device"; U.S. Pat. No. 6,922,725, entitled: "Method and Apparatus For Processing Document Service Requests Originating From A Mobile Computing Device", by disclosing a mobile computing device that controls a connection between the document server and the output device by communicating with the document server over one of its communications channels and with the output device over the other of its communications channels to transmit there between the document in a format suitable for the output device.

An additional problem has been introduced because many documents and services sought to be shared with non-native users (i.e., users not registered users on private networks) are now stored behind firewalls of private networks. A private network is defined herein as any network that restricts access to it at its gateways or individually at each machine. That is, one downside when using mobile computing devices is that network security tends to limit the ability to share documents or services between private networks. Often it is difficult to insure secure access to documents stored on a native network when seeking to apply it to document services of a foreign network.

Generally, a network is coupled to other networks through gateways. A firewall is installed at a gateway to prevent unauthorized access through the gateway. For example, a private network may take the form of a corporate intranet that is coupled to a public network such as the Internet through a gateway. The gateway of the private network may have a firewall that checks messages entering or exiting the private network. Messages will pass through the firewall only if they meet predefined security criteria (e.g., come from a specified address, are directed to specified ports, etc.).

Solutions exist, such as a virtual private network (VPN), that permit a registered user of a private network to securely access the content of documents or services located inside the firewall of the private network from or through public networks. A registered user of a private network can use a VPN, for example, to access document or service located on the private network and provide them to a non-registered user of the private network. Other solutions exist as described in U.S. Pat. No. 6,397,261, which discloses a system that provides secure transfer of a document referenced by a document token that is transferred from an issuer to a holder. Another solution is described in U.S. Pat. No. 6,971,017, entitled: "Ad Hoc Secure Access To Documents and Services" and incorporated herein by reference, which describes a document server residing on a network behind a firewall that provides secure access to documents or services residing thereon.

There exists therefore a continued desire to provide an improved path for routing document service request originating at a mobile computing device and taking place between a token-based server and an output device that has inadequate network connectivity with the token-based server (e.g., no access rights or control, no ability to authenticate user). It would be further desirable if such an improved path for routing documents would provide increased security in the event there is an existing but inadequate connection between the token-based server and the output device.

SUMMARY OF INVENTION

In accordance with one aspect of the invention there is provided a method, apparatus and article of manufacture therefor, for submitting a document service request from a mobile device to a document processing device coupled to a first network and being adapted to communicate with one or more servers coupled to a second network. From the mobile device, a first connection and a second connection are established with the document processing device. At the mobile device, a document service request is specified that includes a document identifier identifying a document in a first document format and its location on the second network. The document service request is submitted together with a device identifier to an output server coupled to the second network from the mobile device over the first connection with the document processing device. The document is received in a second format from the output server at the mobile device over the first connection with the document processing device. The second format of the document is an input format of the document processing device. The document received from the output server in the second format is resent to the document processing device from the mobile device over the second connection with the document processing device for performing a specified document service thereon.

In accordance with another aspect of the invention there is provided a method, apparatus and article of manufacture therefor, for controlling a plurality of document service request at a mobile device to be carried out at a document processing device. The method involves defining in a job ticket for an identified document at the mobile device a workflow that specifies two or more document service requests for which at least one of the plurality of document service requests is to be performed at the document processing device. The job ticket is transmitted from the mobile device to the document processing device upon receipt of input instructing the document service request to be carried out at the document processing device. The document processing device is adapted (a) to perform all document service requests specified in the job ticket or (b) to forward processed document result data and the job ticket to another document processing device to perform uncompleted ones of the document service request specified in the job ticket.

In accordance with another aspect of the invention there is provided a method, apparatus and article of manufacture therefor, for redirecting document service requests at a first document processing device using a mobile device. Information is received at the first document processing device identifying a user of the mobile device. The first document processing device subsequently identifies those document service requests submitted by the user of the mobile device and determines device status information concerning the user submitted document service requests. The first document processing device transmits to the mobile device the status information concerning the user submitted document service requests to allow the user of the mobile device to assess whether the first document processing device is capable of carrying out the user submitted document service requests. In response to receiving from the mobile device at the first document processing device ones of the user submitted document service requests selected for redirection, the first document processing device redirects the ones of the user submitted document service requests selected for redirection to a second document processing device.

BRIEF DESCRIPTION OF DRAWINGS

These and other aspects of the invention will become apparent from the following description read in conjunction with the accompanying drawings wherein the same reference numerals have been applied to like parts and in which:

FIG. 15 illustrates an example workflow description for the document service request workflow illustrated in FIGS. 10-14.

DETAILED DESCRIPTION

A. Operating Environment

Figure 1:
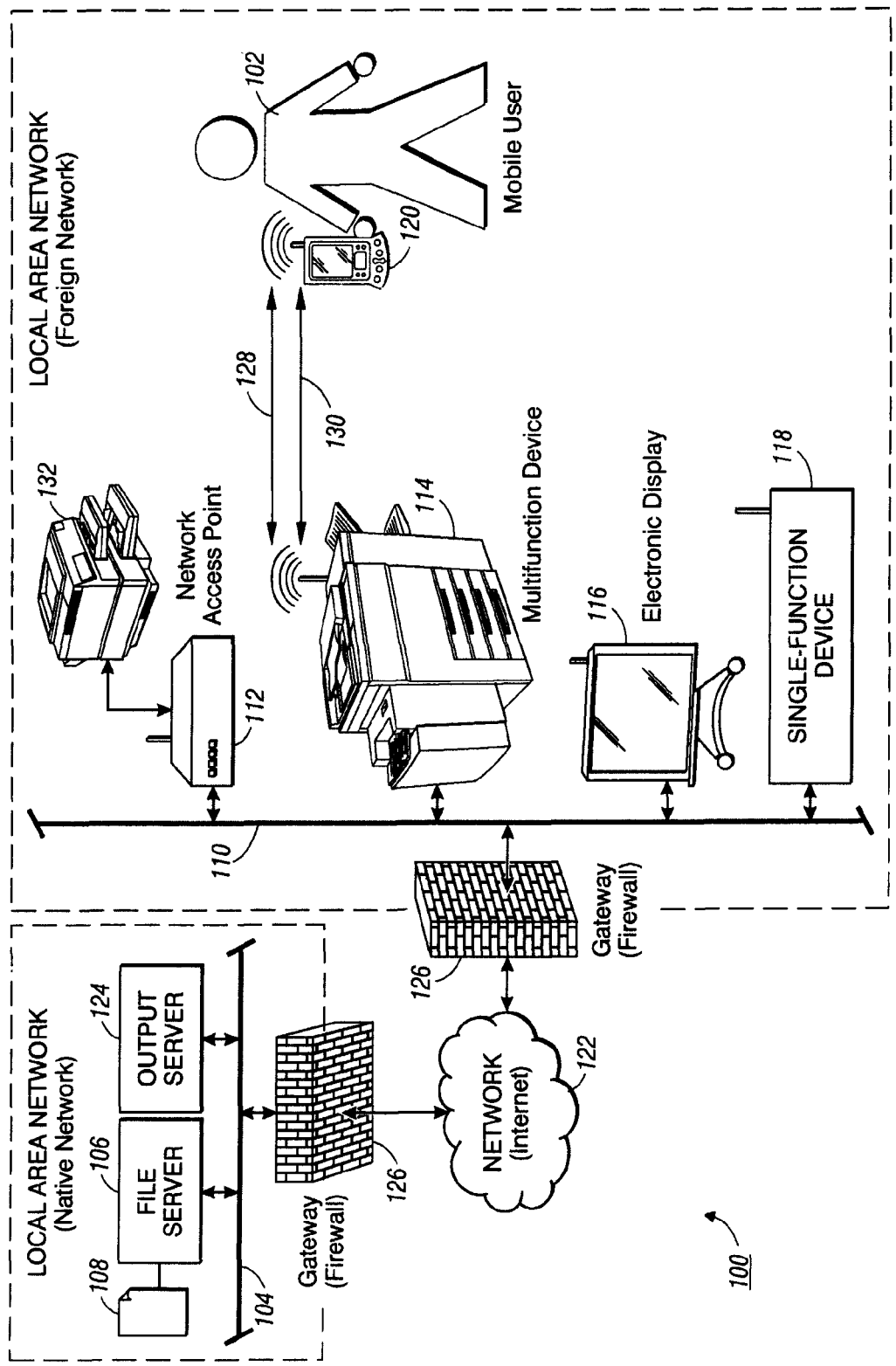
FIG. 1 illustrates an operating environment for carrying out the present invention.

FIG. 1 illustrates an operating environment 100 for carrying out the present invention. The operating environment 100 is one in which a mobile user 102 is a fully authenticated registered user (e.g., having a defined set of access rights) of local area network 104, otherwise referred to herein as the mobile user's native network 104. The mobile user 102 has, for example, access rights to file server 106 that is adapted to store in the user's directories documents such as document 108.

In one embodiment of the operating environment 100, the mobile user 102 is physically proximate to local area network 110, otherwise referred to herein as the foreign network 110 that is remote from the mobile user's native network 104. Generally, the mobile user 102 is given a very limited set of access rights in the remote network 110 (e.g., guest privileges), but sufficient for example to access the Internet 122 through the foreign network's gateway 126, which may have a firewall, using well know protocols such as HTTP (HyperText Transfer Protocol). The foreign network 110 may for example be a company intranet, a network in a public place such as an airport, or a network in a commercial center such as grocery store.

Coupled to the foreign network 110 are systems for providing document service requests, such as, network access point 112, multifunction (or document processing) device 114, display 116 (e.g., such as the Xerox LiveBoard™), and single-function device 118 (e.g., scanner, facsimile, printer, binder). The document processing device 114 includes device specific capabilities for printing, scanning, faxing, and providing network access to registered and non-registered or guest users of the network 110. These services may be offered for free or for fee depending on the nature and location where the services are offered. In addition, the document processing device 114, as well as, the display 116, and single-function device 118 may have embedded therein functionality for serving as a network access point. Generally, network access points serve as a bridge between short-range wireless connections with the mobile device 120 and the foreign network 110.

In alternate embodiments, the document services available at the document processing device 114 include any number of hardcopy and/or electronic services that are not device specific such as a translation service, a summarization service, a format conversion service (e.g., an optical character recognition (OCR) service), a scan-to-file service (i.e., storing, e.g., using Xerox® FlowPort™), a recommender service, a messaging service (e.g., emailing, SMS, and faxing), a document location service, and an enrichment service that all can be applied on their own or in addition to applying a device specific service (e.g., printing) using, for example, a document service request workflow described below in section B.3 with reference to FIGS. 10-16. The translation service translates a document from one language to another using well known translation systems. The summarization service summarizes document content using one of a plurality of well-known methods. The recommender service may provide recommendations using a recommender system such as Knowledge Pump developed by Xerox Corporation. The enrichment service may be provided by a meta-document management system as described in U.S. patent application Ser. No. 09/543,962, which is incorporated herein by reference. The document location service may be provided using the services disclosed in U.S. patent application Ser. No. 10/605,630, which is incorporated herein by reference.

When away from the native network 104, the mobile user 102 carries a mobile computing device 120 adapted to establish at least one short-range connection with devices coupled to the foreign network 110. The short range connection may be established over RF (Radio Frequency) using, for example, a Bluetooth specification or 802.11 (otherwise known as WiFi—Wireless Fidelity) compliant technology, or over IR (Infrared) using, for example, an IrDA (Infrared Data Association) standard compliant technology. Examples of mobile computing devices include: mobile phones, PDAs (Personal Digital Assistants), portable computers, communicators, portable cameras, etc. The mobile computing device 120 when coupled to network 122, such as the Internet, permits the mobile user 102 to browse documents available on networks such as the World Wide Web (WWW).

In addition, the mobile computing device 120 is adapted to store thereon one or more document references (e.g., URLs) and/or documents. The one or more document references and/or documents stored on the mobile computing device may for example either be retrieved from a server or another mobile computing device or created directly thereon or identified while browsing documents on the WWW. In one embodiment, the contents of document references stored on the mobile computing device 120 are stored on the file server 106.

To establish network connectivity in the foreign network 110, the mobile computing device 120 has embedded therein one or more transceivers for establishing one or more wireless (or hardwired) connections (or sessions) that may take place over one or more separate communication channels. A communication channel is defined using one or more protocols, such as for example, HCRP (Hardcopy Cable Replacement Profile), Bluetooth SPP (Serial Port Profile), Bluetooth LAP (LAN Access Profile), or Bluetooth BPP (Basic Printing Profile). The individual communication channels may be established between the mobile device 102 and a single computational device (e.g., document processing device 114) or a plurality of computational devices (e.g., document processing device 114 and network access point 112).

In operating environment shown in FIG. 1 and discussed in more detail below, the mobile computing device 120 in one embodiment establishes two wireless connections 128 and 130 with the document processing device 114. In doing so, a first connection 128 can be made over a Bluetooth LAP connection, and second connection 130 can be made over a Bluetooth SPP connection. Alternatively, both connections could be made using two sessions over a single Bluetooth LAP connection. In an alternate embodiment, the wireless connections 128 and 130 may be made through two different network access points.

Coupled to the native network 104 is an output server 124. The output server 124 may have integrated therein or communicatively coupled thereto on one or more devices, document services, and file services. One document service comprises a conversion service that is adapted to convert a document in a first format to a second format. The first format may for example be in a device or application independent format and the second format in a device or application dependent format. The output server 124 is adapted to locate and retrieve a document given a document reference such as a URL (Universal Resource Locator) at for example the file server 106 before applying the conversion service to the retrieved document. In addition, the output server 124 may include services similar to the document processing device 114 such as translation, OCR, summarization, recommendation, and enrichment. In one specific embodiment, the output server 124 receives an http request with parameters that are the URL of a document and an optional printer type and returns a print-ready file for the specified printer type. Generally if no printer type is specified, a generic print-ready file is created in a common printer readable page description language format such as PostScript or PCL.

In the operating environment 100, the mobile user's native network 104 is bridged to the foreign network 110 by a network 122 that may, for example, be an insecure public network such as the Internet. The network 122 may bridge the networks 104 and 110 using a dedicated land, cellular, or satellite connection. Access from the network 122 to either of the two (private) networks 104 and 110 is made through their respective gateways 126 that may have associated therewith a firewall. The firewalls of either of the (private) networks 104 and 110 generally permit access to insecure networks to the Internet 122 from inside their networks using standard protocols such as HTTP.

B. User Invoked Document Service Requests

This section discusses alternate methods for the mobile user 102 to initiate from the mobile computing device 120, a document service request to be carried out at the document processing device 114. The document service request may either require document input for the document processing device (e.g., a print request) or produce document output from the document processing device (e.g., a scan request).

B.1 Service Requests for Outputting a Hardcopy Document

To summarize one instance of the operating environment 100, the mobile user 102 prints (or performs a combination of one or more alternative or additional document service requests) the document 108 stored on the file server 106 at the document processing device 114. In doing so, the mobile user 102 establishes a secure (e.g., VPN) connection to the mobile user's native network 104 for browsing and identifying the document 108 through the document processing device 114. Once a document is identified, the mobile user initiates the print service request to be carried out at the document processing device 114 by requesting over the secure connection the output server 124 to retrieve and convert the identified document 108 in an output format suitable for the document processing device 114. Upon receipt of the output-ready document, the mobile computing device 120 resends upon receipt (in one embodiment, without waiting for all data of the output-ready document to be received, or alternatively when all data has been received) the output-ready document to the document processing device 114 to carry out the document service request. In an alternate embodiment, the output-ready document is resident on the mobile device 120 (thereby skipping acts 206, 208 and 214 shown in FIG. 2 and described in detail below).

Figure 2:
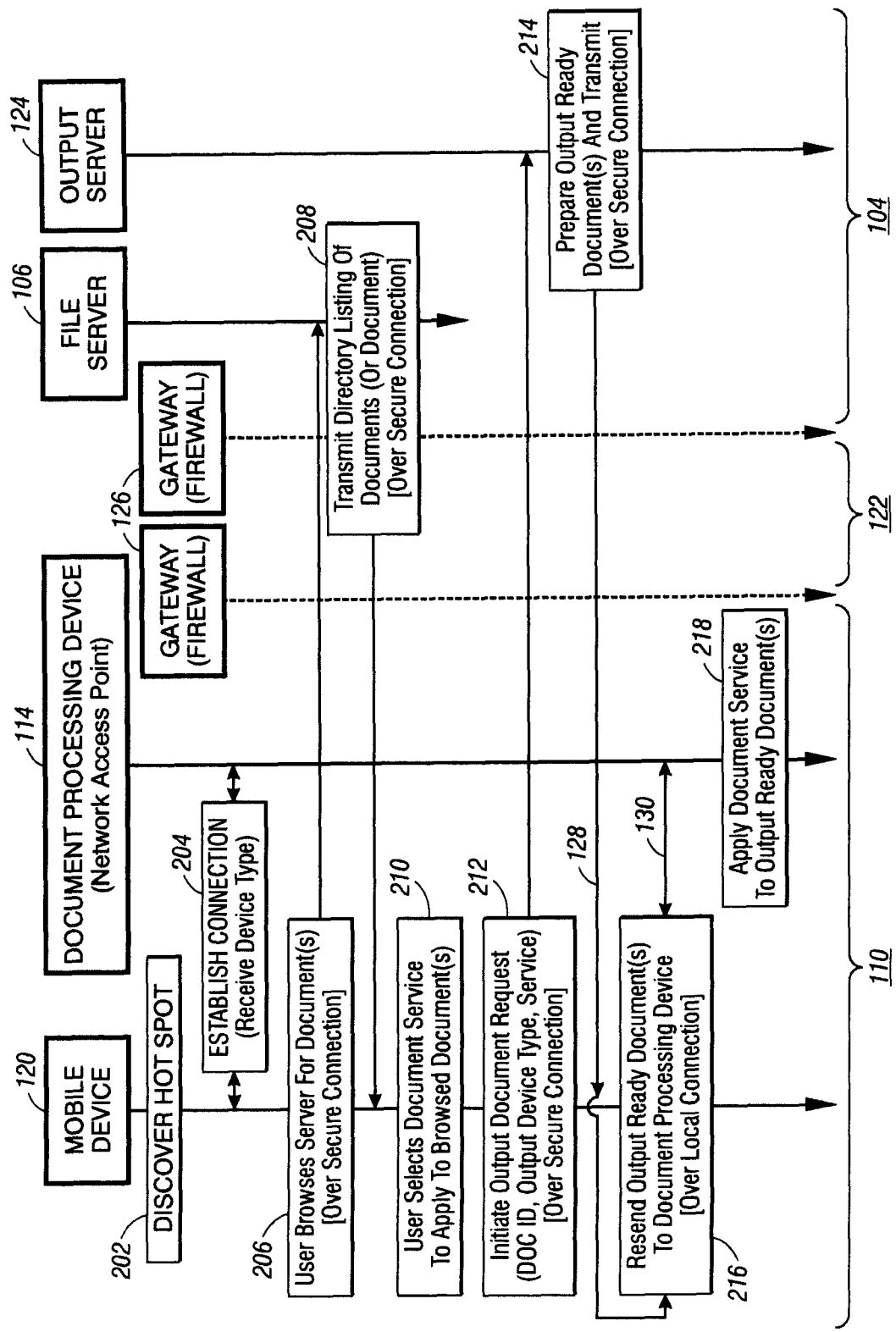
FIG. 2 illustrates a flow diagram of one embodiment for carrying out a document service request at a mobile computing device requiring a document as input.

More specifically, FIG. 2 illustrates a flow diagram of one embodiment for carrying out a document service request at a mobile computing device 120 that requires a document as input. Initially at 202, hot spots (i.e., geographic boundary covered by a wireless access point) in the foreign network 110 are discovered by the mobile device 120 using for example the Bluetooth Inquiry and Service Discovery Protocol (SDP). Once a hot spot is discovered at 202, the mobile computing device 120 establishes at 204 a short-range wireless connection with the document processing device 114, which also serves as a network access point. (In addition at 202 or 204, the mobile device 120 may receive a device type identifier and a list of services available at the document processing device 114.) At 206, the user 102 browses the file server 106 on the native network 104 using the mobile device 120 through the network access point available at the document processing device 114. In the event a secure connection with the native network 104 is required (e.g., because it is protected by firewall 126), a secure connection is established between the mobile device 120 and the file server 106, which depending on the security level authenticates communication or encrypts communications over the connection. In one embodiment, the secure connection is established using a VPN. In an alternate embodiment, IPv6 (Internet Protocol Version 6) is used to establish the secure connection. When communications between the mobile device 120 and the file server 106 are encrypted using a VPN, the communications traveling over the foreign network 110 and the public network 122 are protected from eavesdroppers. In an alternate embodiment, communication connections established between the mobile device 120 and the native network 104 are insecure.

While browsing the file server 106 using the mobile device 104 over a secure (e.g., VPN) session, the mobile user 102 identifies a document and records its identifier (e.g., URL) from a directory listing (or document) received from the file server at 208. In one embodiment, a conventional web browser (e.g., Microsoft® Internet Explorer) is used at the mobile device 120 to identify the document and its identifier on the file server 106. In browsing the file server 106, information transmitted between the file server 106 and the mobile device 120 is transmitted through the document processing device 114 that serves also as a network access point. In an alternate embodiment, a document residing on the mobile device 120 is uploaded to the file server 106 and a URL is directly passed to the output server 124.

At 210, the mobile user 102 selects a document service (of the device to which the connection at 204 is established) to apply to the browsed document identified using a document identifier. In an alternate embodiment, browsing at 206 and 208 may be omitted if the identifier of the document is known in advance (or in an alternate embodiment the document itself is present on the mobile device). In another embodiment, the mobile user defines at 206 and 210 a document service request workflow as described below in section B.3 with reference to FIGS. 10-16. At 212, the mobile device 120 opens a connection, which may be a secure session, with the output server 124. In one embodiment, a document identifier and a device type are transmitted to the output server 124 from the mobile device 120. In an alternate embodiment, the document and the device type are transmitted to the output server from the mobile device.

At 214, in response to receiving the document identifier and device type, the output server (i) locates the document (e.g., from the file server 106), (ii) prepares it for output at a device of the specified type (including the processing of any additional requested document services), and (iii) transmits the output ready document to the mobile device 120 over the secure session. Similar to browsing performed at 206 and 208, information is transmitted at 212 and 214 between the output server 124 and the mobile device 120 through the document processing device 114 that serves also as a network access point.

At 216, upon receipt of the contents of the output ready document, the mobile device 120 establishes a local connection (or session) with the document processing device 114. Over the local connection, the mobile device 120 resends to the document processing device 114 the contents of the output ready document and, optionally, parameters of a document service request (e.g., print parameters such as: staple, color, bind, duplex, etc.), if any, to apply to the output ready document at 218. In one embodiment, the mobile device maintains two simultaneous wireless connections (or sessions) with the document processing device 114, as shown in FIGS. 1 and 2 at 128 and 130, to perform 216. In this embodiment, the mobile device 120 transmits the output ready document to the document processing device 114 over the connection 130 incrementally as it is received from the output server 124 over the connection 128 (where connections 128 and 130 may be two different sessions over the same connection).

In one embodiment at 216, the first connection 128 consists of a secure connection with the output server 124 and the second connection 130 consists of a local connection with the document processing device 114. As set forth above, the first connection 128 can be made over a Bluetooth LAP connection, and second connection 130 can be made over a Bluetooth SPP connection. In an alternate embodiment, both connections could be made using two separate sessions over a single Bluetooth LAP connection. In another embodiment, the wireless connections 128 and 130 may be made through two different devices. For example, the connection 128 with the output server 124 could be made through the network access point 112 and the connection 130 could be made then with the document processing device 114 using Bluetooth's HCRP (Hardcopy Cable Replacement Profile) or BPP (Basic Printing Profile).

Figure 5:
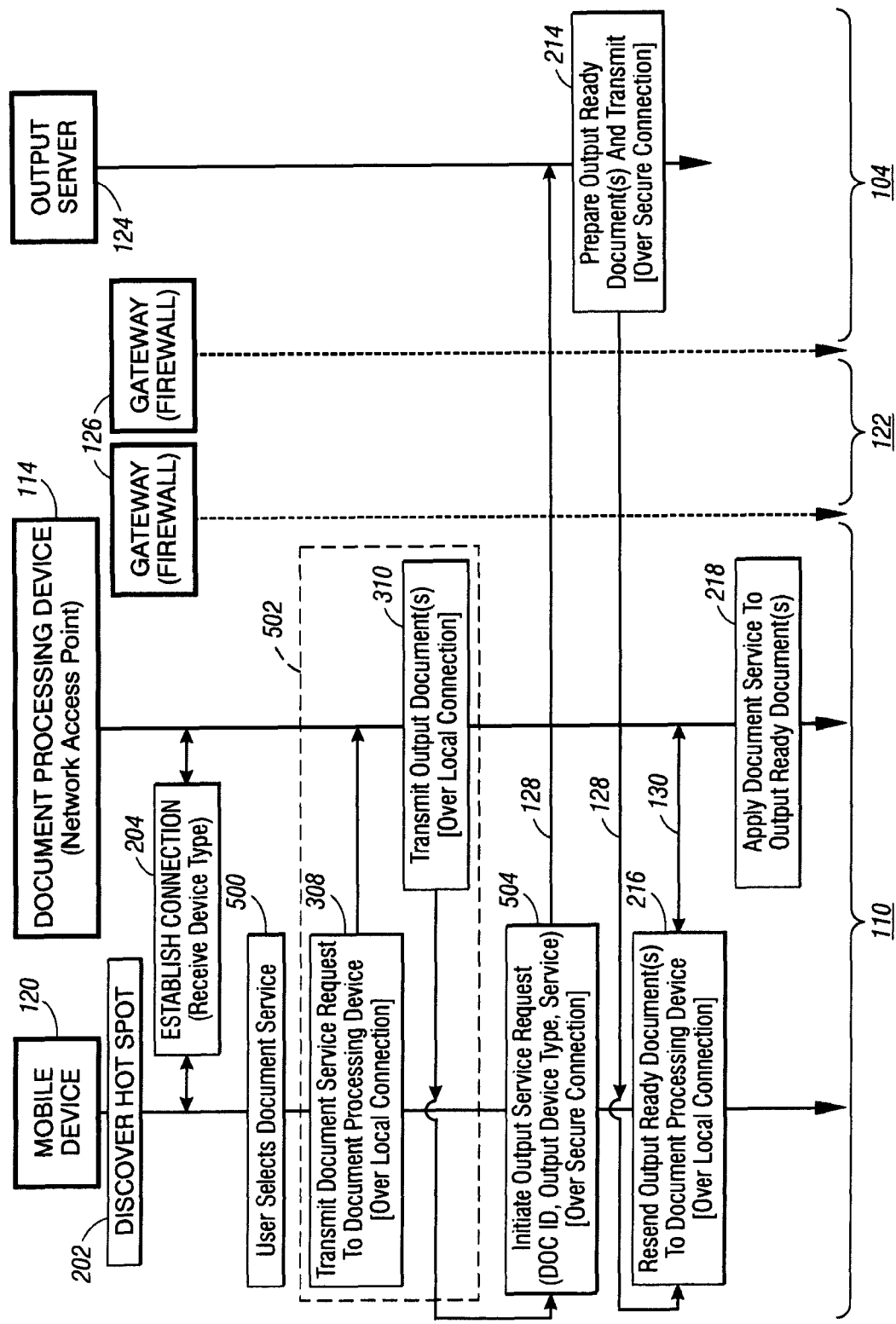
FIG. 5 illustrates a flow diagram of yet a further embodiment for carrying out a document service request at a mobile computing device.
Figure 6:
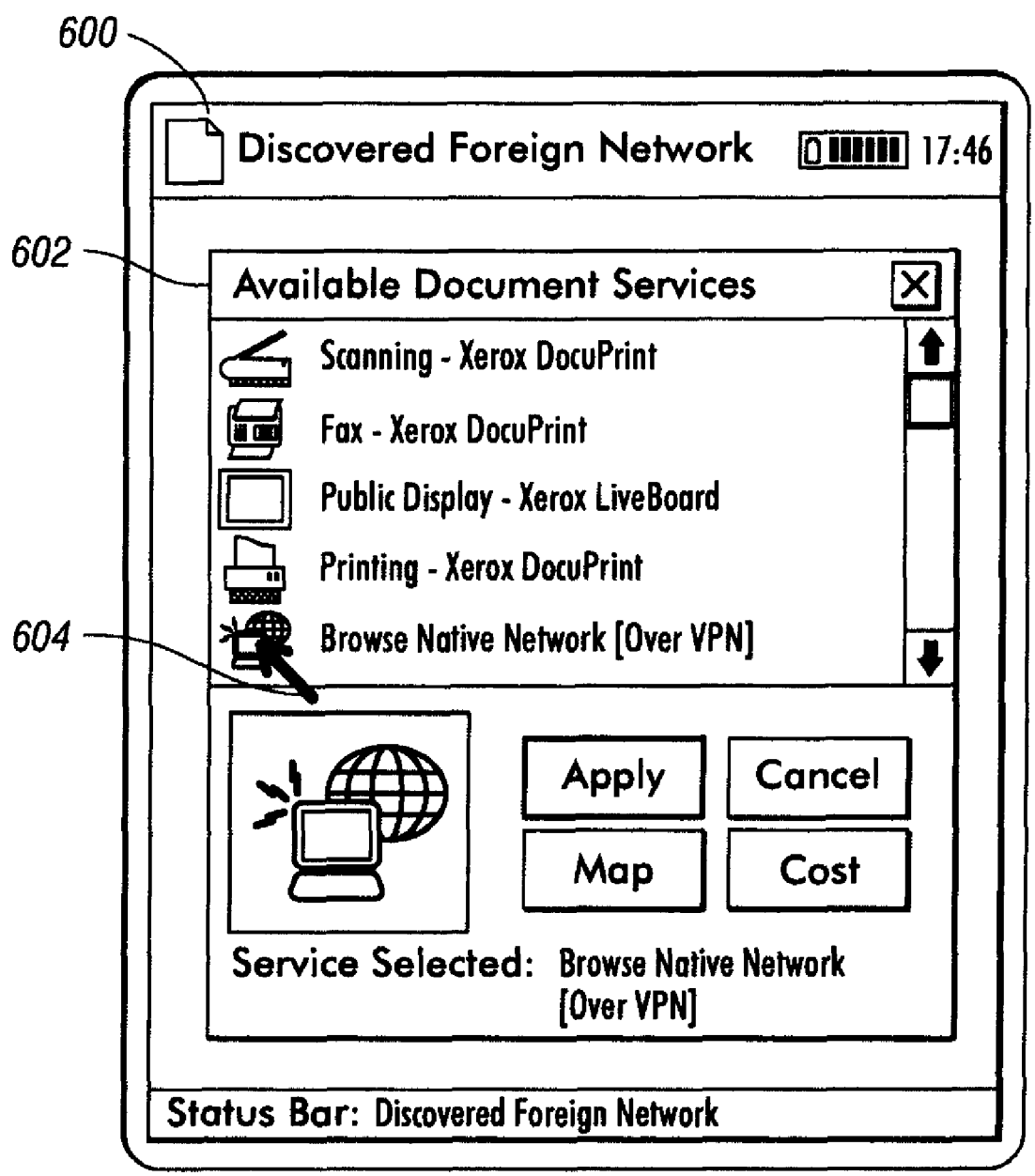
FIGS. 6-9 illustrate one example of a user interface for specifying document service requests illustrated in FIGS. 1-4.
Figure 7:
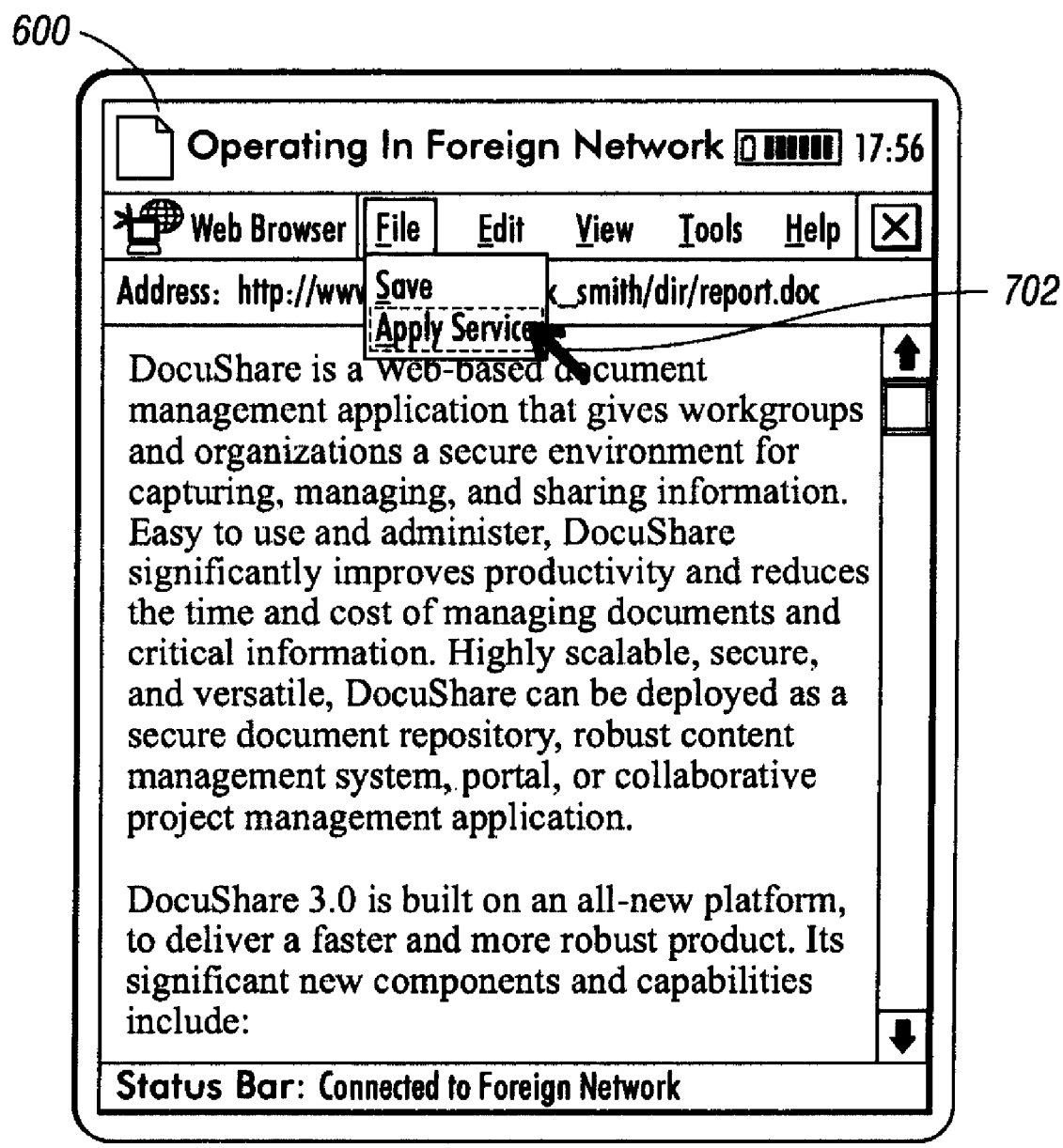

FIG. 5 illustrates a flow diagram of another embodiment for carrying out a document service request at a mobile computing device. Similar to the embodiment shown in FIG. 2, a connection is initially established with the document processing device at 202 and 204. Subsequently at 500, the user specifies a document service to apply at the document processing device as well as at the output server, such as, image enhancement, translation, summarization, emailing, OCR, etc. In this embodiment, either the mobile user 102 selects a document available on the mobile device (e.g., an image) at 500, or optionally scans a hardcopy document at the document processing device 114 at 502 (the details of acts 308 and 310 are described with reference to FIG. 3 below). In one embodiment, the mobile user defines at 500 and/or 502 a document service request workflow as described below in section B.3 with reference to FIGS. 10-16.

Subsequently at 504, either the document resident on the mobile device is directed to the output server 124 or the scanned document is resent to the output server 124 for additional document processing not available at the document processing device 114. The document received at 214 is processed in accordance with the selected document service request and converted into a format suitable for input to the document processing device 114. Once received over a first connection, the output ready document is resent over a second connection for processing by the document processing device at 216 and 218. Similar to the embodiment shown in FIG. 2, the first connection 128 may consists of a secure connection and the second connection 130 may consist of a local connection.

B.2 Service Requests for Outputting an Electronic Document

To summarize another instance of the operating environment 100, the mobile user 102 scans (or performs a combination of one or more alternative or additional document service requests) a document at the document processing device 114 and store it in the file server 106 as document 108. In doing so, the mobile user 102 establishes a secure (e.g., VPN) connection to the mobile user's native network 104 to identify a file location through the document processing device 114. Once a document location is identified, the mobile user initiates the scan service request to be carried out at the document processing device by requesting over a local connection with the document processing device a hardcopy document input thereto to be scanned. Upon receiving the scanned document directly from the document processing device 114, the mobile device 120 resends the scanned document over a secure connection to the file server 106 for being stored thereon.

Figure 3:
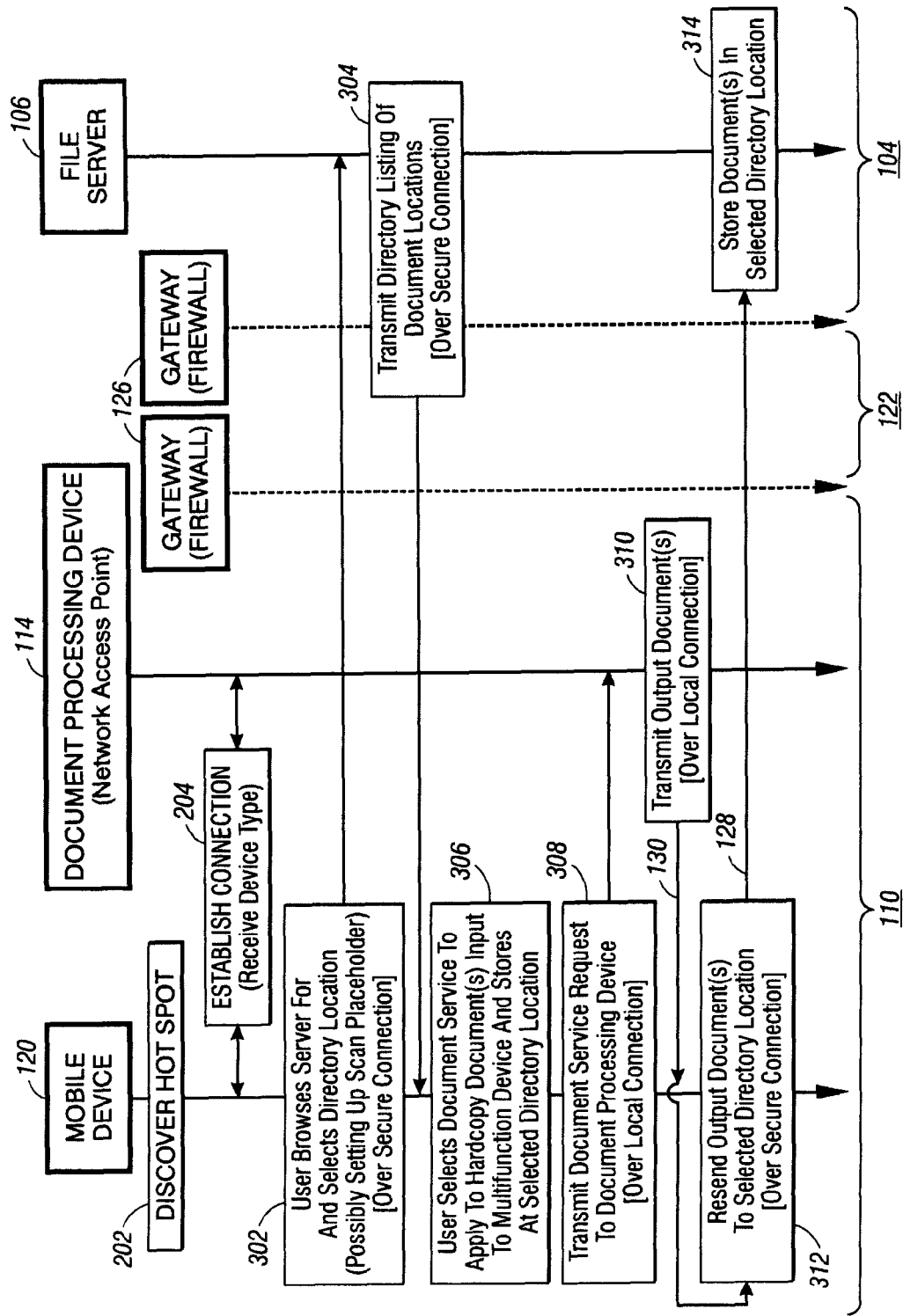
FIG. 3 illustrates a flow diagram of another embodiment for carrying out a document service request at a mobile computing device requiring a hardcopy document as input.

More specifically, FIG. 3 illustrates a flow diagram of another embodiment for carrying out a document service request at a mobile computing device 120, which when selecting the scan document service requires a hardcopy document as input. Similar to the embodiment shown in FIG. 2, initially a short-range wireless connection is established with the document processing device 114 at 202 and 204.

At 302 and 304, similar to 206 and 208 in FIG. 2, the user 102 browses the file server 106 on the native network 104 using the mobile device 120 through the network access point available at the document processing device 114. However, unlike at 206, the user at 302 identifies a directory location at which a processed document is to be stored. In one embodiment, the mobile user creates a placeholder for the scanned document as described in U.S. Pat. No. 6,868,424 entitled "Electronic Filing System With File-Placeholders" and U.S. Patent Application Publication No. 2004/0205622 entitled "Electronic Filing System With Scan-Placeholders", which are incorporated herein by reference.

At 306, the user selects a document service to be applied to a hardcopy document input to the document processing device 114, the electronic output of which is to be stored at a specified directory location identified at 302. In another embodiment, the mobile user defines at 302 and 306 a document service request workflow as described below in section B.3 with reference to FIGS. 10-16. In an alternate embodiment, acts 302 and 304 are omitted in the event the user knows in advance the directory location at which to store the electronically processed hardcopy document. At 308, the document service request is transmitted over a local connection established with the document processing device 114.

At 310, once the document processing device 110 carries out the document service request (e.g., scanning plus other services such as OCR, summarization, etc.) of the hardcopy document input thereto, an output document (e.g., the electronic representation of a scanned hardcopy document) is transmitted to the mobile device 120. Upon receipt of the output document, the mobile device 120 resends the contents of the output document to the file server 106 to be stored in the selected directory location at 312 and 314. In another embodiment, the document processing device 114 simply scans the hardcopy document (or does not perform all requested services for) at 219 and the mobile device retransmits the scanned hardcopy document at 313 to a remote server (e.g., file server 106) for carrying out the one or more "other" document service requests (e.g., OCR, summarization, store, etc.).

In one embodiment, 310 and 312 are performed at the mobile device 120 by maintaining two wireless connections (or sessions) simultaneously with the document processing device 114, as shown in FIGS. 1 and 2 at 128 and 130. In this embodiment, the mobile device 120 transmits the output document to the file server 106 over the connection 128 (e.g., using Bluetooth LAP) incrementally as it is received from the document processing device 114 over the connection 130 (e.g., using Bluetooth SPP).

Figure 4:
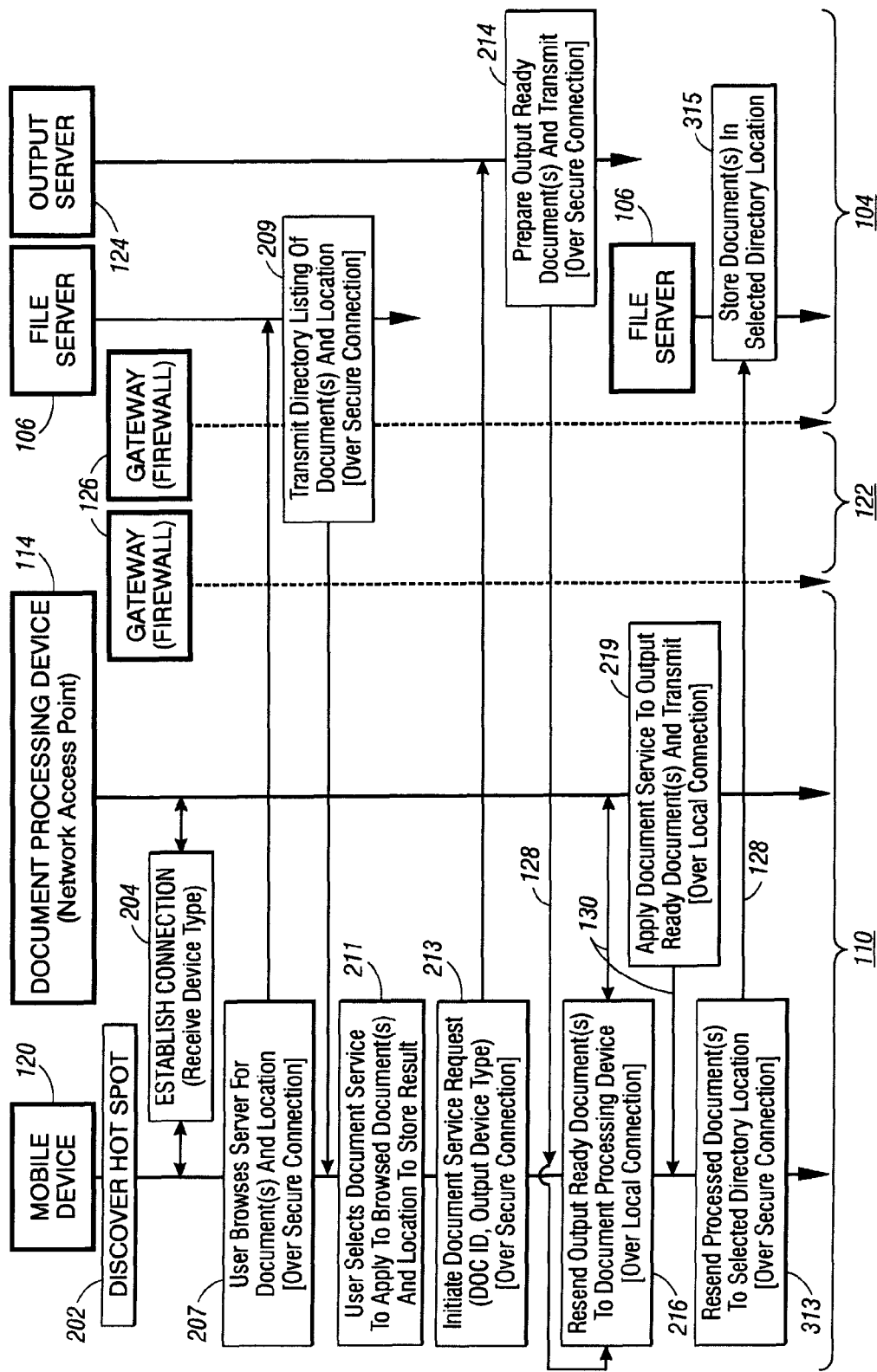
FIG. 4 illustrates a flow diagram of yet another embodiment for carrying out a document service request at a mobile computing device requiring an electronic document as input.

FIG. 4 illustrates a flow diagram of another embodiment for carrying out a document service request at a mobile computing device 120 that anticipates an electronic document as input and produces an electronic document as output after applying one or more document services (e.g., summarization, OCR, etc.). Similar to the embodiments shown in FIGS. 2 and 3, initially a connection is established with the document processing device at 202 and 204. Subsequently at 207 and 209, the user browses for a document and a location at which to store a document.

At 213 a document service request is initiated, once the document is identified at 211 on which the service is to be performed, the output device type, and the location at which the resulting output document is to be stored. In one embodiment, the mobile user defines at 207 and 211 a document service request workflow as described below in section B.3 with reference to FIGS. 10-16. Similar to FIG. 2 at 214, the output server 124 retrieves and prepares the identified document in a format for the document processing device 114. In one embodiment, no additional processing is necessary to prepare the document for processing at device 114. In alternate embodiments, processing is performed by applying document services such as a document service that may for example add proprietary markings and/or integrate variable image data.

Upon receipt at the mobile device 120, the output ready document is resent to the document processing device at 216. Once the output ready document is processed by the document processing device at 219, the resulting document is transmitted over a second connection to the mobile device and resent over a first connection at 313 to the file server 106 to be stored at 315 in the specified directory location. Similar to the embodiment shown in FIG. 3, the first connection 128 may consists of a secure connection and the second connection 130 may consist of a local connection.

B.3 Example User Interfaces of the Mobile Device

Figure 8:
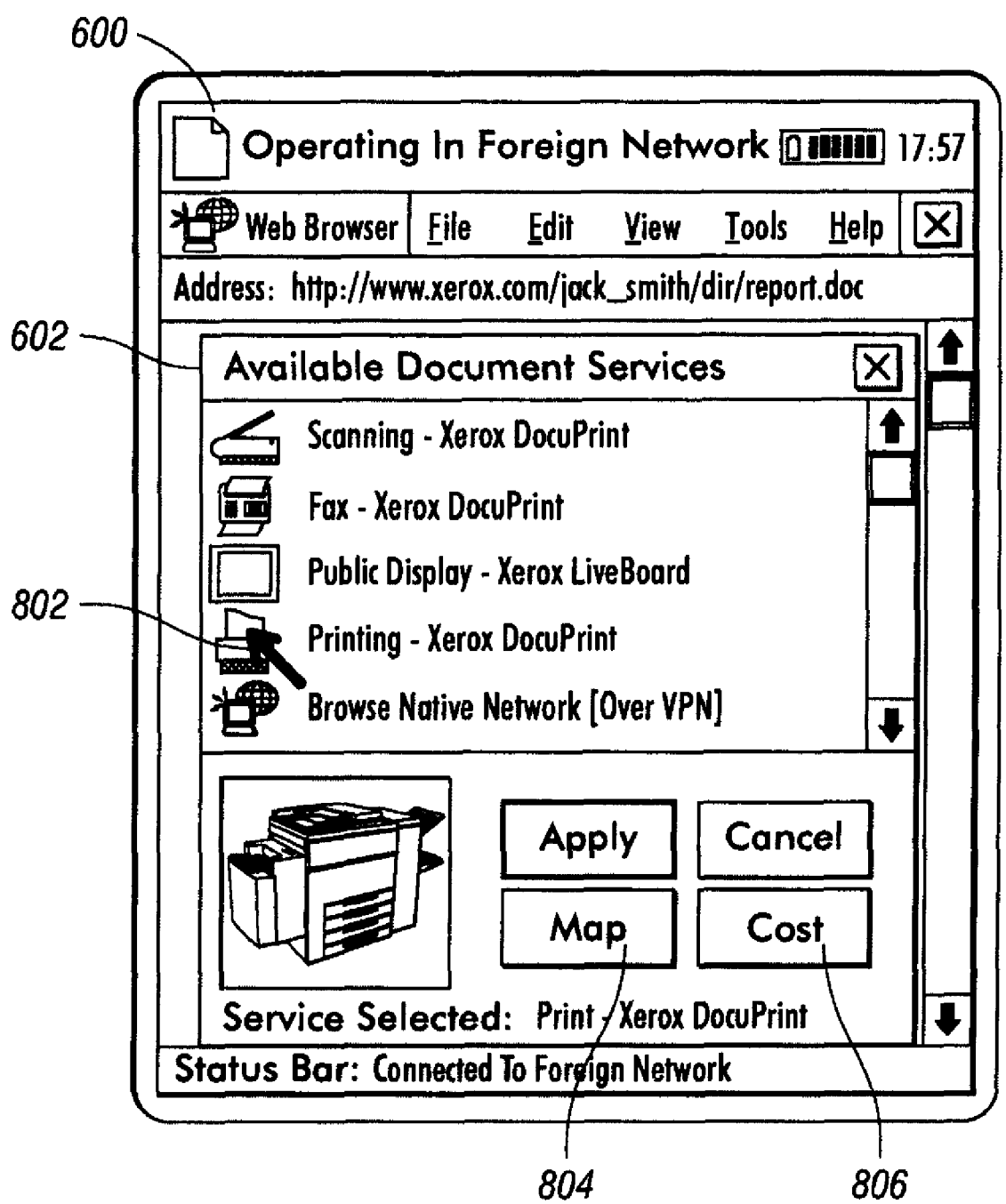
Figure 9:
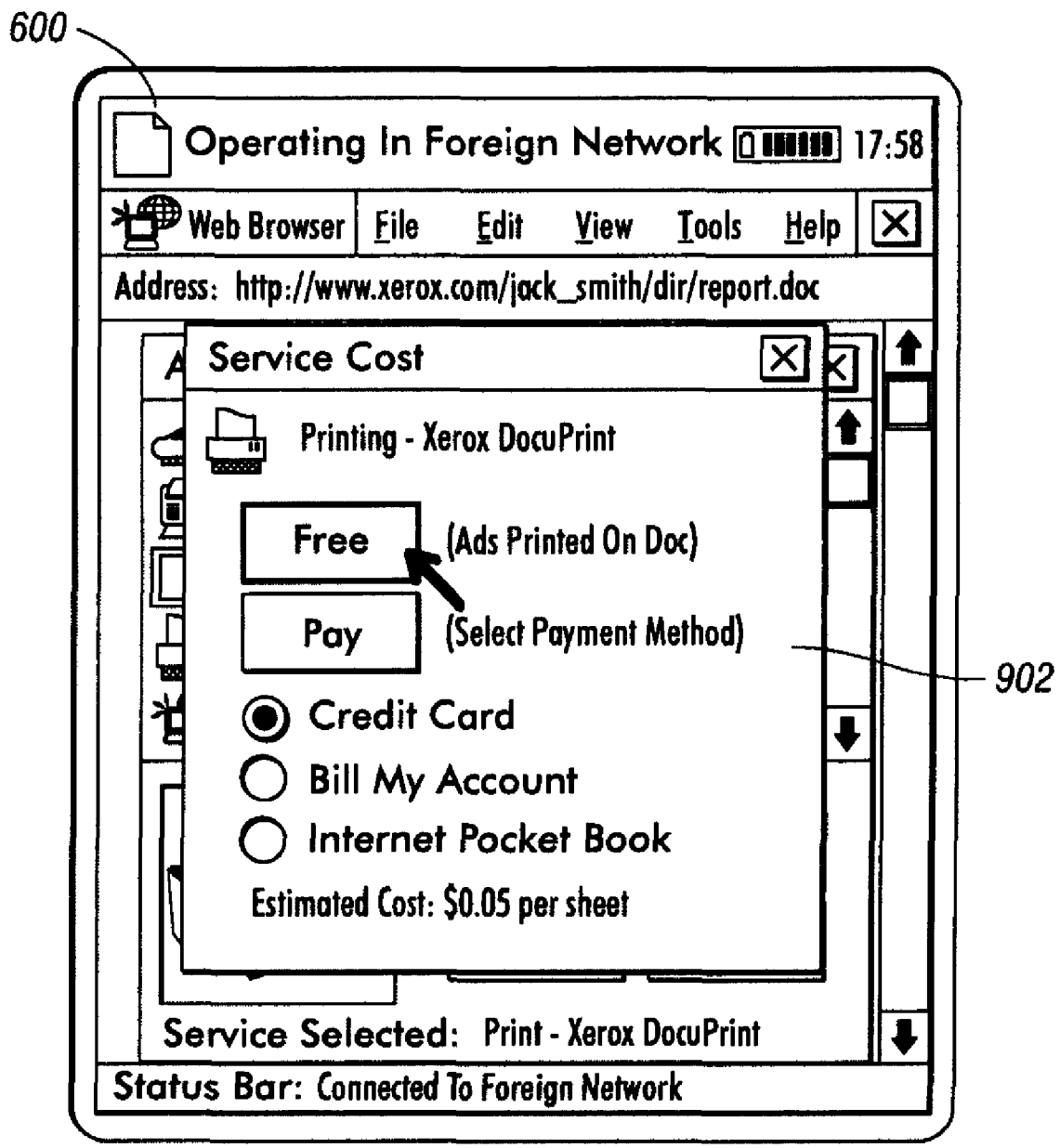

FIGS. 6-9 illustrate one example of a user interface 600 of the mobile device 120 for specifying document service requests illustrated in FIGS. 1-5. Initially, in discovering a hot spot at 202, a list of available document services is provided to the user from the document processing device 114 as shown in window 602 in FIG. 6. By selecting the browsing service at 604, the user is able to browse for or directly input an address of a document to which a service can be applied as shown at 702 in FIG. 7. As shown in FIG. 8, the window 602 showing a list of the available services is again redisplayed and printing is selected at 802 as a service to apply to the identified document in FIG. 7. Further as shown in FIG. 8, an identifier (e.g., a picture, model, brand, etc.) of the selected device for performing the service is displayed and an option (at 804) to view a map of its location can be invoked, as well as, a form of payment of the document service can be specified (at 806) (if not otherwise free because the user specified that ads may appear on the printed document) as shown in service cost window 902 in FIG. 9.

Figure 10:
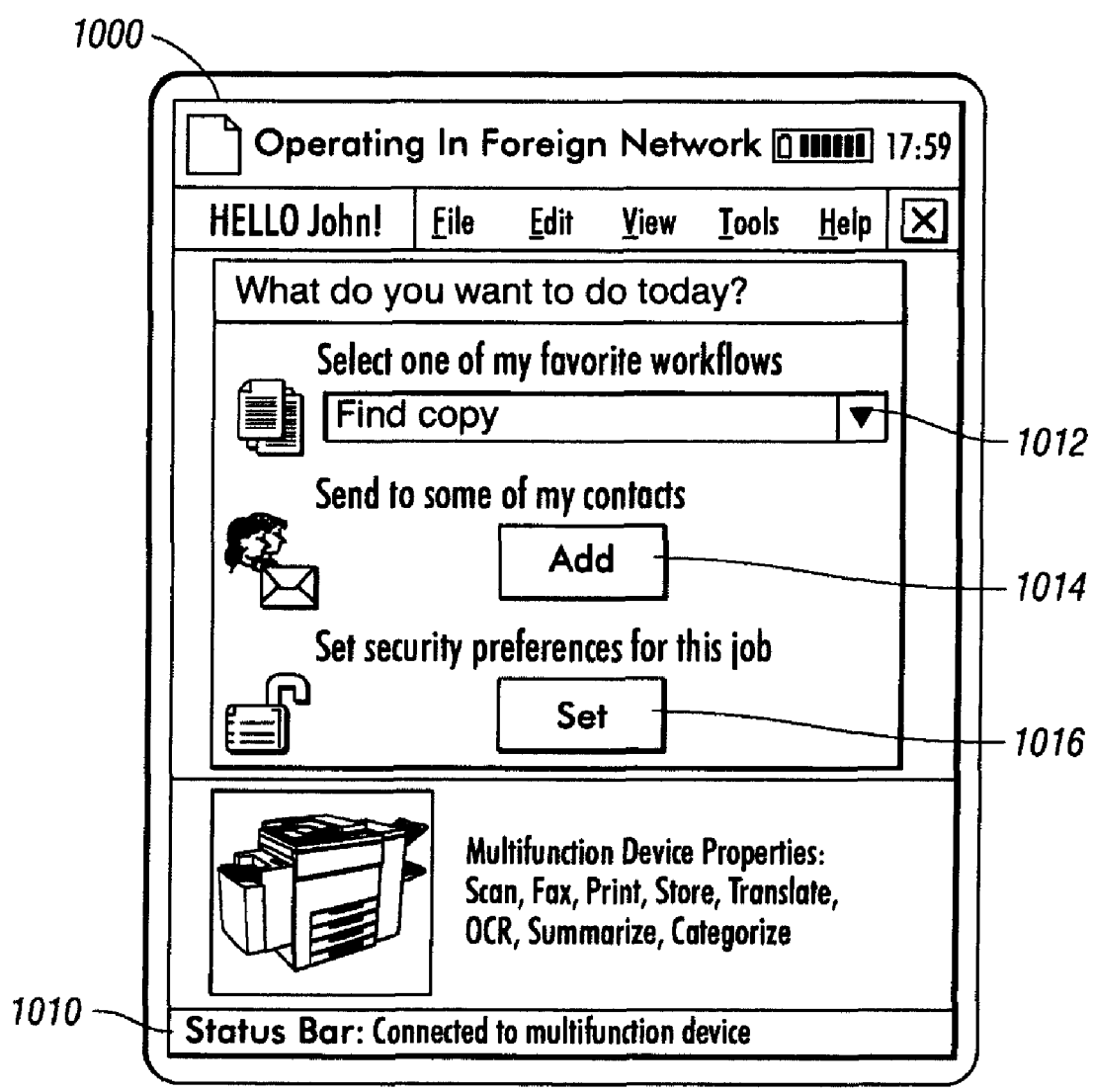
FIGS. 10-14 illustrate another example of a user interface for specifying document service requests illustrated in FIGS. 1-4.

FIGS. 10-14 illustrate another example of a user interface 1000 of the mobile device 120 for specifying document service requests illustrated in FIGS. 1-5. In FIG. 10, after discovering the hotspot at 202 and connecting to the document processing device 114 as shown at 1010 in the user interface 1000, the user is given the ability to specify a series of document service requests using one or more workflow definitions from the menu 1012, which in one embodiment are job tickets specifying predefined and/or user customizable workflow templates. Alternatively, at 1014 a user may specify contacts to which content (such as an email and/or documents) should be sent. In addition, at 1016 a user may set security preferences for content processed at 1012 or 1014.

Figure 11:
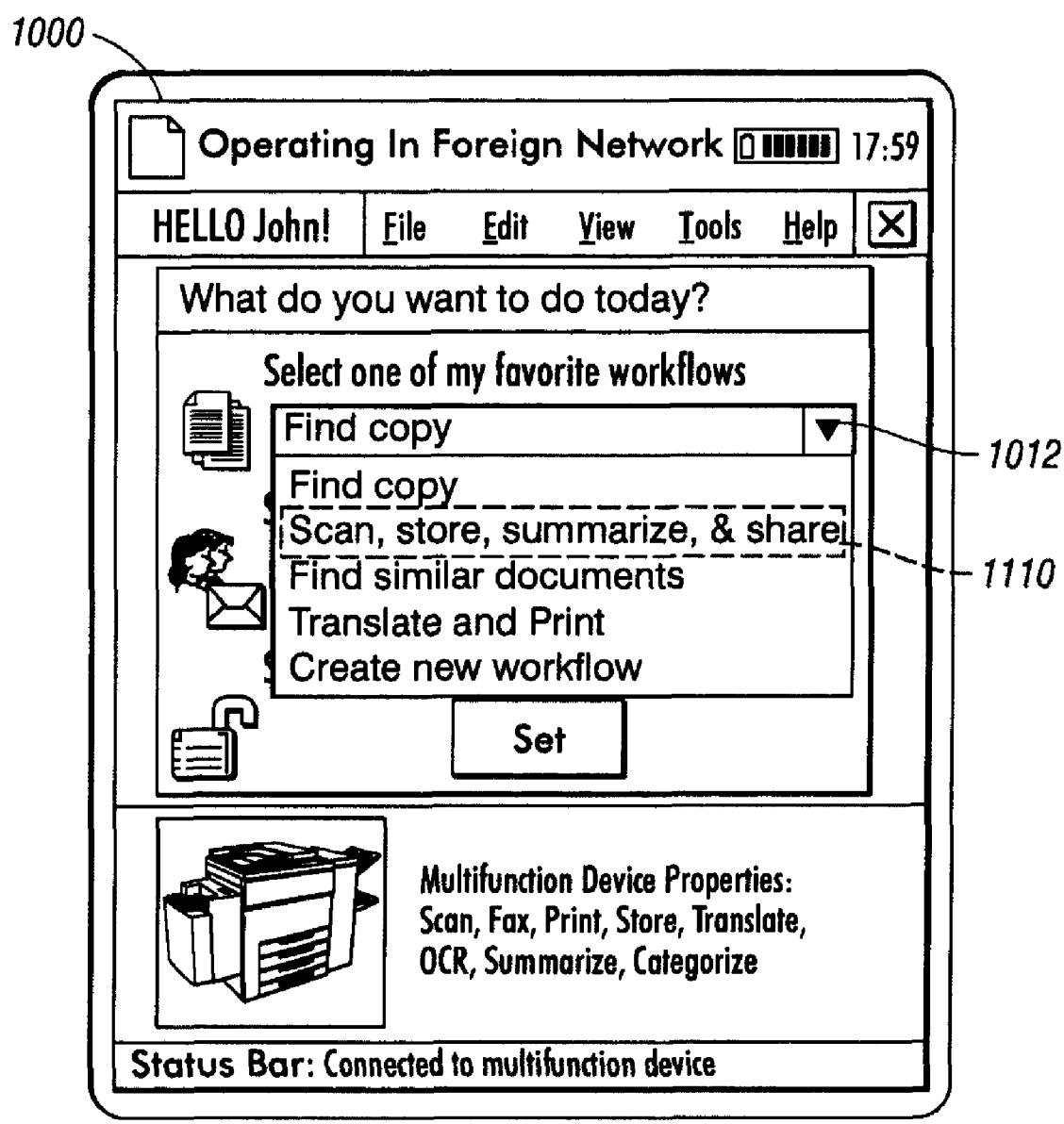
Figure 12:
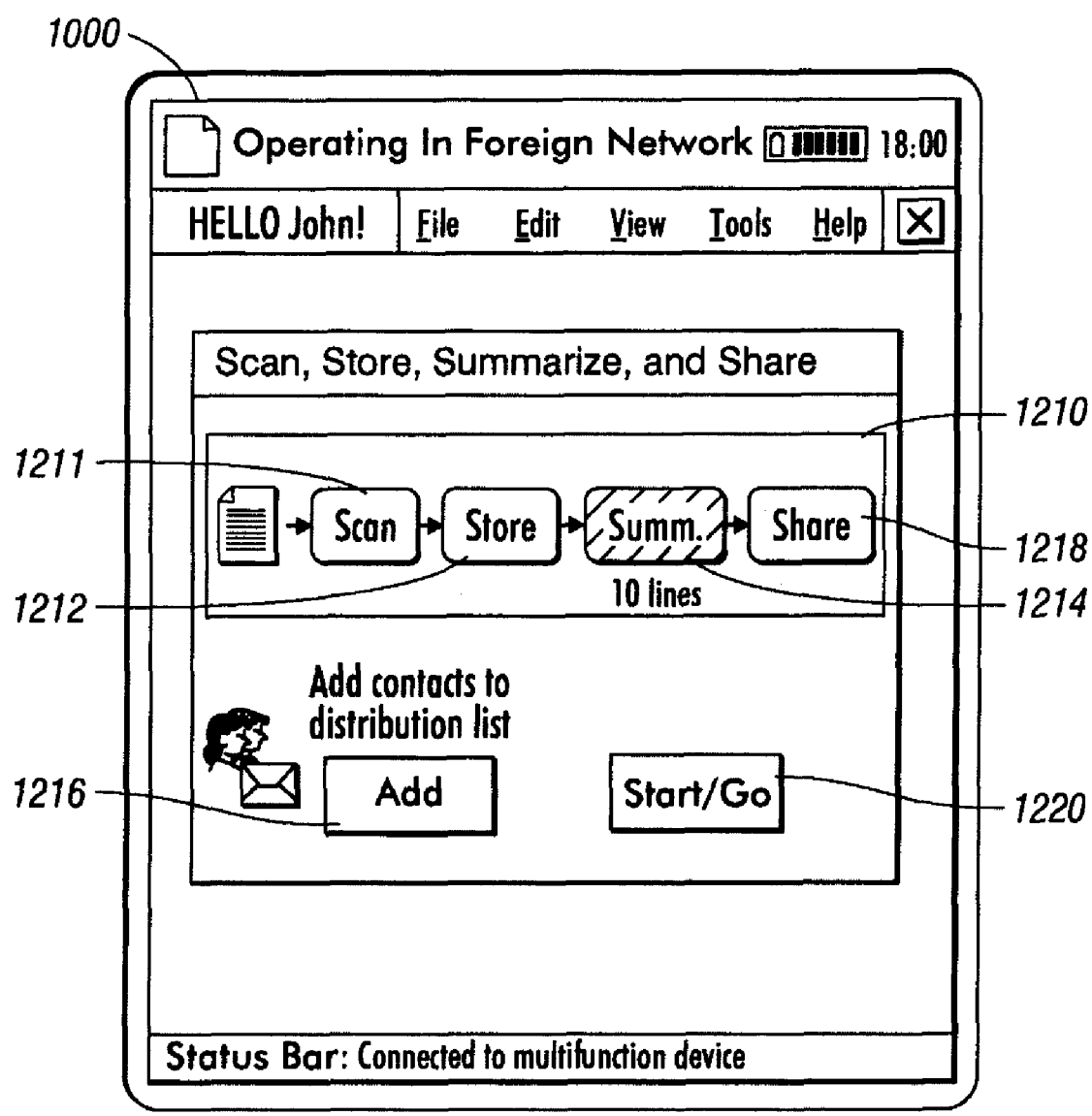

After selecting the document service workflow template 1110 from the menu 1012 as shown in FIG. 11, a detailed workflow according to the selected template is presented to the user as shown at 1210 in FIG. 12. The user may review or modify the parameters associated with each stage of the document service workflow 1210. In the example shown in FIG. 12, parameters for each stage of the workflow may be reviewed and/or modified by selecting one of the scan stage 1211, store stage 1212, summarization stage 1214, and share stage 1218 of the document service workflow 1210 (see for example, the parameter "10 lines" for the summarization stage 1214 selected in FIG. 12).

It will be appreciated that although this example workflow concerns scanning, storing, summarizing, and sharing a document, many other workflows may be defined that include one or more actions relating to, for example, scanning, printing, retrieving, storing, formatting, summarizing, translating, transmitting (e.g., emailing, faxing), and enriching document content. In addition, it will be appreciated that although this example shows a single path workflow (e.g., (1) scan to (2) store to (3) summarize to (4) share) multiple path workflows may be defined (e.g., from (1) scan to (2a) store to (3) summarize to (4) share and from (1) scan to (2b) print)), with single or multiple paths may include conditional branches.

Figure 13:
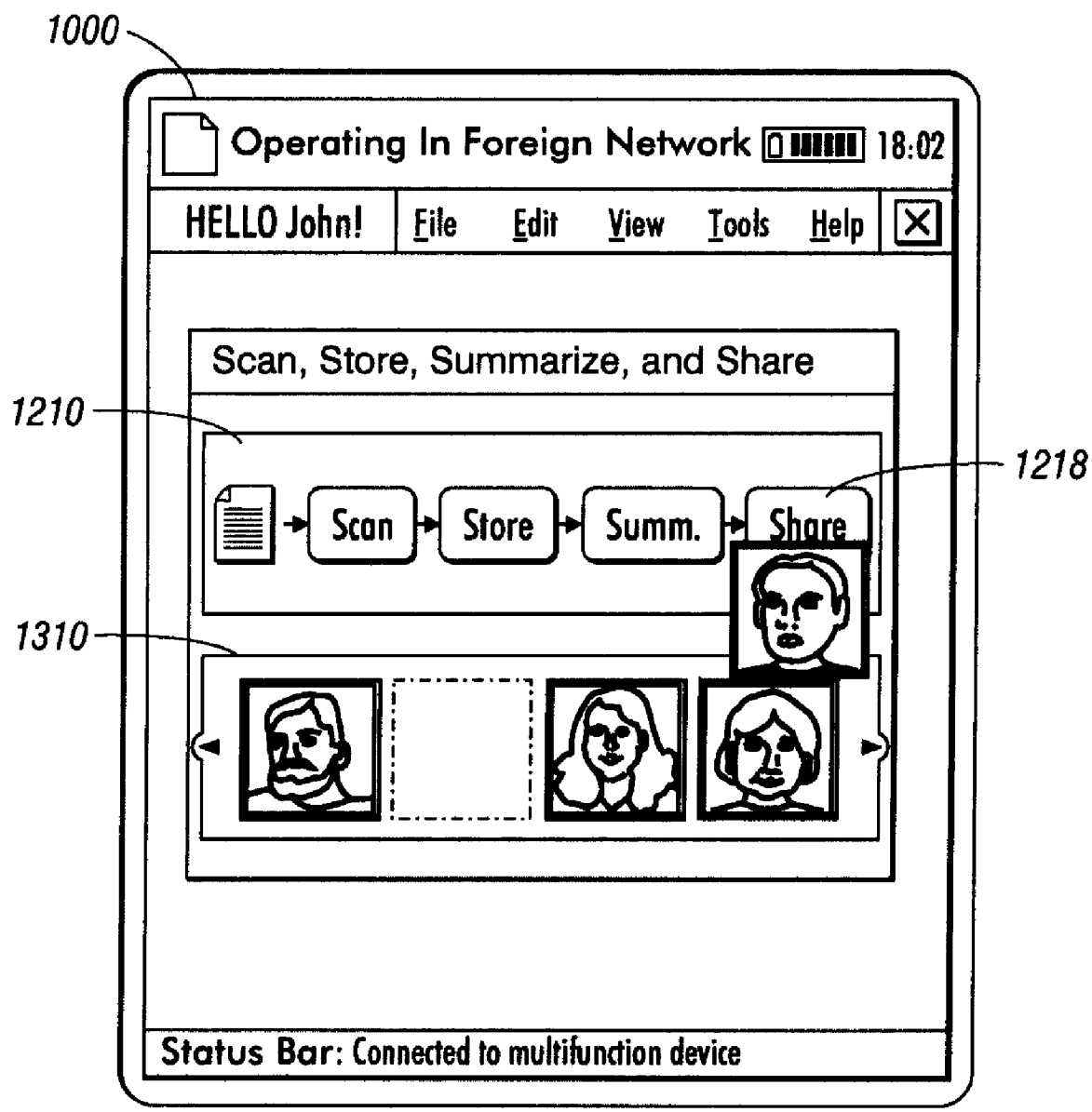

Further as shown in FIG. 12, the user is given the ability at 1216 to add contacts to the distribution list used at the share stage 1218 of the selected workflow. In FIG. 13, images of contacts on the user's contact list 1310 appear after the add button at 1216 in FIG. 12 is selected by the user. The user may subsequently add contacts to the shared distribution list by dragging and dropping images of contacts in the user's contact list 1310 onto the share stage 1218 of the workflow 1210. Once all desired parameters have been reviewed and/or modified in the different stages of the workflow 1218, the document service workflow 1210 is initiated by selecting start button 1220 shown in FIG. 12. Upon completion of all stages of the document service workflow 1210, a summary completion screen 1410 is presented to the user as shown in FIG. 14.

Figure 14:
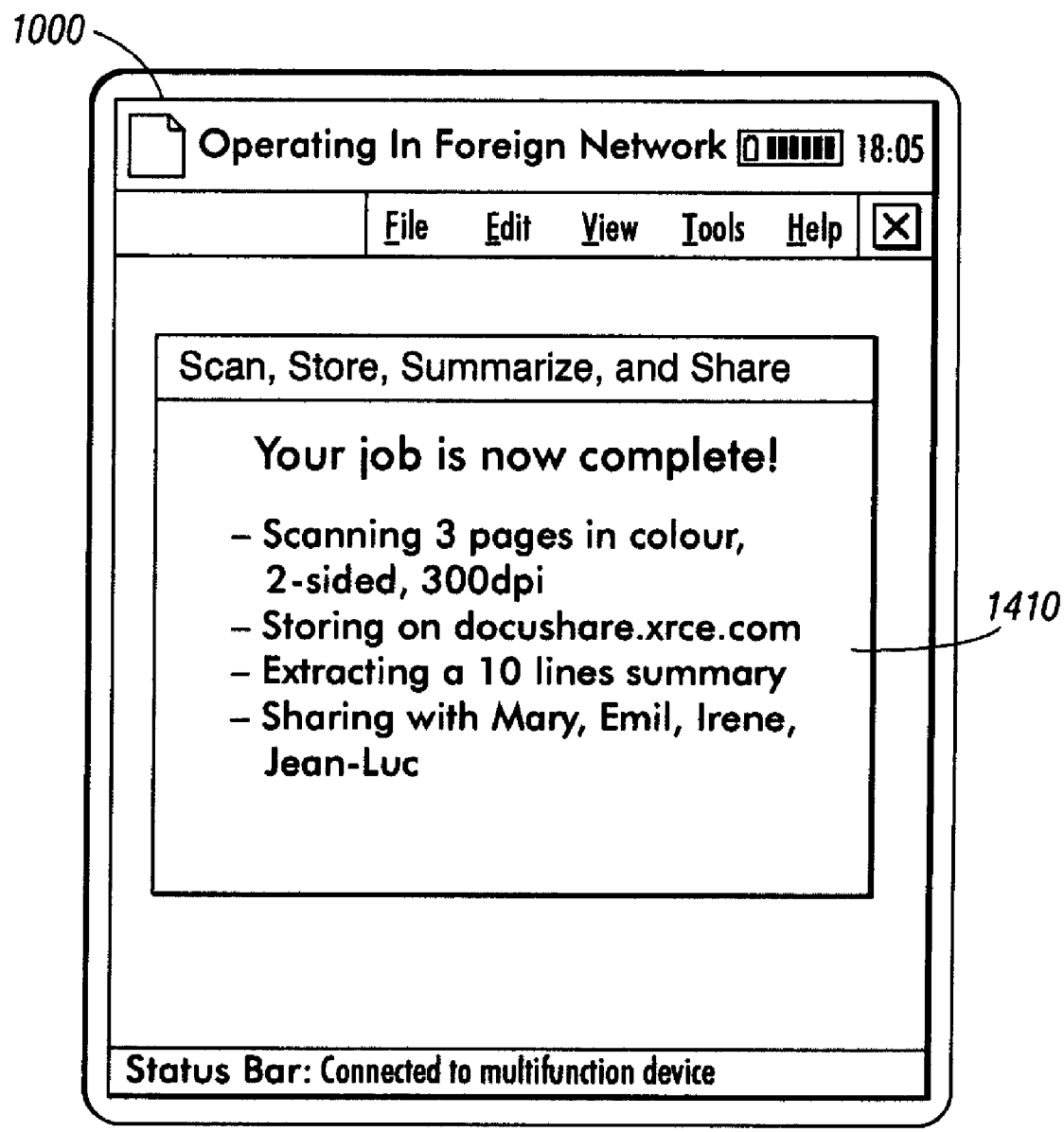

FIG. 15 illustrates an example document service workflow description 1500 for the document service request workflow 1218 illustrated in FIGS. 12-14. The workflow description 1500, which in the illustrated embodiment is encoded using XML, may originate from a template "job ticket" already present on the mobile device and at which the user may modify the job ticket's properties. Alternatively, the job ticket may be retrieved over a connection from the document processing device 114 to the user's mobile device. For example, when adding a contact as shown in FIG. 13, the workflow description 1500 may be modified by adding the additional contact as shown at 1512. The (modified) workflow description 1500 is then transmitted over the (established) connection from the mobile device to a document processing device adapted to perform the specified workflow description such as the document processing device or scanner to initiate the document service request(s).

In this embodiment, the scanning options 1502 and transfer options 1504 are read by the document processing device 114. Once the input document placed on the scanner is recorded, the document processing device 114 transfers the file of the scanned document along with the job ticket to a document distribution server adapted to carry out tasks remaining in the distribution options 1505, which include storing the scanned document as specified by storing options 1506, summarizing the scanned document as specified by summarizing options 1508, and sharing (e.g., emailing) the scanned and summarized document as specified by sharing options 1510. The storing, summarizing, and sharing tasks performed subsequent to the transfer task may be performed by one or more document distribution servers that may operate locally and/or remote from the document processing server performing the initial (scanning) processing task.

C. Management of Document Service Requests

Another aspect of the operating environment 100 concerns the management of document service requests once they are submitted to a device, such as the document processing device 114, on the foreign network 110. In this embodiment, the mobile device 120 initiates document service management requests. Yet another aspect of the operating environment 100 concerns document service requests initiated by devices in the foreign network 110 such as those sent to the document processing device 114. In this embodiment, the document processing device 114 senses the mobile user's presence and/or detects the mobile computing device 120 and transmits offers for services or offers to redirect services submitted thereto to other more appropriate (or functioning) devices located on the foreign network 110 (or possibly on another network coupled to the network 122).

Figure 16:
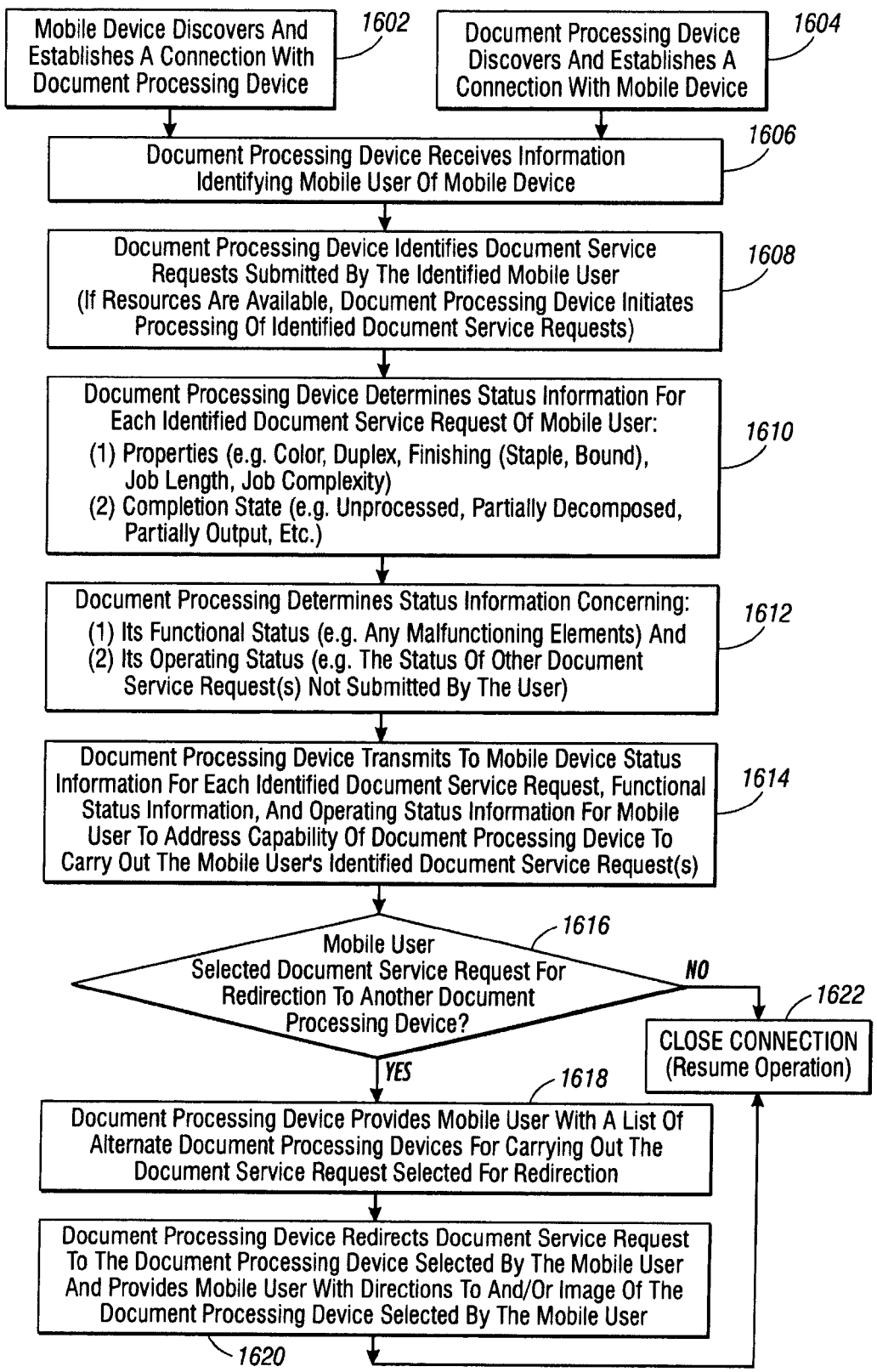
FIG. 16 illustrates a flow diagram for managing using a mobile device document service requests submitted to a document processing device.

FIG. 16 illustrates a flow diagram for managing using a mobile device document service requests submitted to a document processing device. Initially at 1602 and 1604, a connection is established between the mobile device 120 and the document processing device 114. In a first embodiment at 1602, the mobile user 102 establishes the connection with discovery of hot spots using the mobile device 120. In a second embodiment at 1604, the document processing device 114 discovers the presence of the mobile computing device 120 in its hot spot.

In one embodiment for example, the document processing device 114 monitors the signal strength of devices in its hot spot. Using Bluetooth wireless technologies which can sense devices within ten meters, the document processing device 114 establishes a connection with the mobile device 120 when it is in range over an RF channel and measures the RSSI (Remote Strength Signal Indicator) reading. The RSSI reading is then used to determine whether the mobile user 102 is approaching or moving away from the document processing device 114.

At 1606, the document processing device receives information identifying the mobile user 102 of the mobile device 120. In one embodiment, the mobile user 102 has access rights on the foreign network 110 and is therefore recognized by the devices coupled thereto. In an alternate embodiment, the mobile user is not recognized on the foreign network 110 and is registered thereon. The user may be registered using, for example, the unique MMAC address of the mobile device.

At 1608, the document processing device 114 identifies document service requests submitted by the identified mobile user. In one embodiment, the document processing device queries its system manager to identify document service requests located on its system. In this embodiment, if resources are available to the system, the document processing device begins processing the identified document service requests. (This would have the advantage of speeding up service requests of a user physically located proximate to the document processing system.) In an alternate embodiment, the document processing device 114 queries a shared document (print) server (that spools and renders print requests) for service requests of the user. The document (print) server may be a standalone device on the foreign network 110 or form part of another device such as document processing device 114. In addition, in this embodiment, the document processing device 114 can fetch those ready for processing (e.g., files in a PDL (Page Description Language) format), even if the service request was not directed at the document processing device 114. Once pre-processing has completed (i.e., the service request is ready for output processing), the document processing device holds the service request for the user's request to carry out the service request at that device, as discussed at 1620 below. This advantageously speeds the output process once the confirmation is received to carry out the service request by mobile device that pre-processed service request, and provides some assurances that service requests are performed in the physical presence of the mobile user.

At 1610, the document processing device 114 determines status information for each identified document request of the mobile user, including its properties (e.g., color, duplex, finishing, number of copies, job length, job complexity, etc.), and completion state. At 1612, the document processing device 114 determines status information concerning its functional status (e.g., any malfunctioning elements of the device or warnings (e.g., low toner level indicator, paper jam)) and its operating status (e.g., the status of other document service request not submitted by the user (e.g., multiple copy print job being printed)).

At 1614, the document processing device 114, either on its own (e.g., at 1604) or at the request of the mobile device (e.g., at 1602), transmits to the mobile device 120 information concerning each service request of the mobile user, as well as, functional status information and operating status information of the device itself. Upon receipt, this information may be presented as a form with device identification information, and lists of service requests together with their properties and completion state.

Responsive to 1614, the mobile user at 1616 selects document service requests, if any, (which were either submitted directly by the user or retrieved by the device in anticipation of user selection) to be redirected to another document processing device. If no service requests are selected at 1616 by the mobile user, then the management of the document service requests terminates at 1622 and normal operation resumes (deleting service requests retrieved from the document (print) server that were not originally submitted to the device and processed at the document processing device (e.g., printed)); otherwise at 1618, the document processing device 114 provides the mobile device 120 with a list of alternative document processing devices for carrying out the document service requests selected for redirection.

At 1620, upon receiving the selected alternative document processing device (s), the document processing device 114 redirects the selected document service requests (either directly or indirectly through a document (print) server). In addition at 1620, the document processing device 114, provides the mobile device 120 with directions and/or an image of the document processing device selected by the mobile user to where the selected document service requests were redirected, and thereafter terminating the connection and resuming normal operation (i.e., continue with service request pending in the system) at 1622.

D. Miscellaneous

It will be appreciated by those skilled in the art that in one embodiment document service request carried out over a local connection with the document processing device 114 from the mobile computing device can be carried out using the user interface extension described in U.S. patent application Ser. No. 10/272,870 entitled "Marking Machine User Interface Enhancement Via Portable Electronic Device"; and Ser. No. 10/272,871 entitled "Marking Machine User Interface Supplementation Via Added, Attached Portable Electronic Device", which are incorporated herein by reference and provide a user interface extension to allow data entry into a field of the user interface of the document processing device from an mobile computing device via compatible communications ports. The document processing device in this alternate embodiment includes a user interface field into which data must be entered, the user lets the machine know that data will come from the mobile communication device, and the marking machine begins monitoring its communications ports for the data from the mobile communication device. The user enters or selects data to be transmitted from the mobile communication device, then indicates that the data is ready to be sent, at which point the mobile communication device transmits the data to the marking machine.

It will be further appreciated by those skilled in the art the following advantages of resending data received by (i.e., looping data through) the mobile device 120 over the connections 128 and 130 with a document processing device 114. First, the process of initiating a document service request from within the native network makes network-topology independent, facilitating access to public or native networks through a foreign network's firewall that has a standard configuration. That is, as long as the servers on the native network are accessible from a network (whether or not it is from a foreign network), the mobile device will be able to be used to apply document service requests in a foreign network to documents available in the native network, where the access to the documents in the native network is secure. Second, resending data (i.e., looping data through) the mobile device requires minimum processing power and minimum memory, thereby eliminating the need to cache an entire document before forwarding it (either for processing (e.g., a print-ready file) or once processed (e.g., a scanned document)). Third, resending data (i.e., looping data through) the mobile device consequently retains security within the mobile device 120, which can be authenticated by the native network 104, advantageously not requiring the foreign network to have any access privileges to the native network 104.

In one specific embodiment, the network access point 112 is a Bluetooth to Ethernet Access Point, such as, BlueLine™ manufactured by Roving Networks Inc., which allows legacy devices (i.e., not Bluetooth equipped) to be connected through the access point's over a port (e.g., USB) using, for example, Bluetooth SPP (Serial Port Profile). This embodiment, as shown in FIG. 1 by the network access point 112 coupled to legacy printer 132, advantageously requires no configuration changes in order to provide receive document service requests in the manner described herein.

It will be also appreciated by those skilled in the art that the native network 104 may form part of a hosted Internet service.

In such an embodiment, the documents may be conventional web pages stored on file servers with little or no access restrictions. Thus, in this embodiment the connection 128 described above between the mobile device 120 and/or the file server 106 and the output server 124 would not need to be secure (e.g., does not require a VPN connection to be established).

It will in addition be appreciated by those skilled in the art that the functions of the file server 106 and output server 124 may be performed by a plurality of servers distributed over one or more networks. Alternatively, the functions of the file server 106 and the output server 124 may form part of a single application running on one or more servers.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hardwired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for redirecting document service requests at a first document processing device using a mobile device, comprising:
    establishing simultaneously, from the mobile device, a first connection and a second connection with the first document processing device,
    receiving information at the first document processing device over the first connection that identifies a user of the mobile device;
    identifying at the first document processing device those document service requests submitted by the user of the mobile device;
    determining at the first document processing device status information concerning the user submitted document service requests; and
    transmitting from the first document processing device over the first connection to the mobile device the status information concerning the user submitted document service requests to allow the user of the mobile device to assess whether the first document processing device is capable of carrying out the user submitted document service requests; and
    wherein in response to receiving from the mobile device at the first document processing device ones of the user submitted document service requests selected for redirection, the first document processing device redirects over the second connection the ones of the user submitted document service requests selected for redirection to a second document processing device.

2. The method according to claim 1, wherein the user of the mobile device has access rights to a foreign network.

3. The method according to claim 1, wherein the first document processing device identifies the document service requests submitted by the user of the mobile device by querying a system manager.

4. The method according to claim 1, wherein the first document processing device identifies the document service requests submitted by the user of the mobile device by querying a document server.

5. The method according to claim 1, wherein the status information concerning the user submitted document requests determined at the first document processing device includes functional status information, operating status information or combinations thereof.

6. The method according to claim 1, wherein in response to receiving at the first document processing device a request for redirecting ones of the user submitted document service requests, the first document processing device provides the mobile device over the second connection with a list of alternate document processing devices, which includes the second document processing device, for carrying out the ones of the user submitted document service requests to be selected by the user of the mobile device.

7. The method according to claim 6, wherein management of the user submitted documents service request terminates if at least one of the user submitted document service requests are not selected by the mobile user.

8. The method according to claim 6, wherein in response to the user at the mobile computing device selecting the second document processing device from the list of alternate document processing devices, the first document processing device receives from the mobile device over the second connection the ones of the user submitted document service requests selected for redirection to the second document processing device.

9. The method according to claim 6, wherein the first document processing device provides the mobile device with directions of the second document processing device over the second connection to which the first document processing device redirects the ones of the user submitted document service requests selected for redirection by the mobile user.

10. The method according to claim 6, wherein the first document processing device provides the mobile device with an image of the second document processing device over the second connection to which the first document processing device redirects the ones of the user submitted document service requests selected for redirection by the mobile user.

* * * * *